US010157073B2

(12) United States Patent
Machida

(10) Patent No.: US 10,157,073 B2
(45) Date of Patent: Dec. 18, 2018

(54) VIRTUAL-MACHINE CONTROL DEVICE, VIRTUAL-MACHINE CONTROL METHOD, COMPUTER-READABLE RECORDING MEDIUM RECORDING PROGRAM FOR VIRTUAL-MACHINE CONTROL METHOD, AND DATA CENTER

(71) Applicant: NEC Corporation, Minato-ku, Tokyo (JP)

(72) Inventor: Fumio Machida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 14/787,988

(22) PCT Filed: May 21, 2014

(86) PCT No.: PCT/JP2014/002665
§ 371 (c)(1),
(2) Date: Oct. 29, 2015

(87) PCT Pub. No.: WO2014/192254
PCT Pub. Date: Dec. 4, 2014

(65) Prior Publication Data

US 2016/0085579 A1 Mar. 24, 2016

(30) Foreign Application Priority Data

May 29, 2013 (JP) ................................ 2013-112906

(51) Int. Cl.

*G06F 9/46* (2006.01)
*G06F 9/455* (2018.01)
*G06F 9/50* (2006.01)

(52) U.S. Cl.

CPC ........ *G06F 9/45558* (2013.01); *G06F 9/5027* (2013.01); *G06F 2009/4557* (2013.01); *Y02D 10/22* (2018.01)

(58) Field of Classification Search
None
See application file for complete search history.

(56) References Cited

U.S. PATENT DOCUMENTS

2006/0041885 A1* 2/2006 Broquere .............. G06F 9/5077 718/1
2006/0085785 A1* 4/2006 Garrett .................. G06F 9/5061 718/1

(Continued)

FOREIGN PATENT DOCUMENTS

JP 2008-517382 A 5/2008
JP 2010-113677 A 5/2010

(Continued)

OTHER PUBLICATIONS

International Search Report for PCT Application No. PCT/JP2014/002665, dated Aug. 5, 2014.

(Continued)

*Primary Examiner* — Diem K Cao

(57) ABSTRACT

A virtual machine control device includes: a generating unit configured to generate an operability constraint for a virtual machine is to be arranged, based on a virtual machine name list of the virtual machine and a host machine name list of a host machine capable to arrange the virtual machine; and a determining unit configured to determine an arrangement of the virtual machine is to be arranged, based on a constraint including the generated operability constraint, the host machine name includes location information of the host machine, and the virtual machine name includes information of component that composes an application service.

9 Claims, 22 Drawing Sheets

START
A1 RECEIVE VIRTUAL MACHINE ARRANGEMENT REQUEST
A2 CREATE VIRTUAL MACHINE NAME LIST
A3 CREATE HOST MACHINE NAME LIST
A4 JUDGE SIMILARITIES AND REGULARITIES BETWEEN HOST MACHINE NAMES AND BETWEEN VIRTUAL MACHINE NAMES
A5 GENERATE OPERABILITY CONSTRAINT
A6 STORE OPERABILITY CONSTRAINT
A7 REFER TO HOST MACHINE CONFIGURATION INFORMATION
A8 REFER TO VIRTUAL MACHINE ARRANGEMENT CONSTRAINT
A9 REFER TO OPERABILITY CONSTRAINT
A10 DETERMINE VIRTUAL MACHINE ARRANGEMENT
A11 OUTPUT VIRTUAL MACHINE ARRANGEMENT
END

(56) References Cited

U.S. PATENT DOCUMENTS

| | | | | |
|---|---|---|---|---|
| 2009/0077552 | A1* | 3/2009 | Sekiguchi | G06F 9/45558 718/1 |
| 2010/0281478 | A1* | 11/2010 | Sauls | G06F 9/5077 718/1 |
| 2011/0225277 | A1* | 9/2011 | Freimuth | G06F 9/45558 709/223 |
| 2012/0266166 | A1* | 10/2012 | Farkas | G06F 9/45533 718/1 |
| 2014/0047444 | A1 | 2/2014 | Yamaguchi | |

FOREIGN PATENT DOCUMENTS

| | | | |
|---|---|---|---|
| JP | 2011-013822 | A | 1/2011 |
| JP | 2011-118864 | A | 6/2011 |
| JP | 2012-523620 | A | 10/2012 |
| WO | 2007/136021 | A | 11/2007 |
| WO | 2012/144647 | A1 | 10/2012 |

OTHER PUBLICATIONS

English translation of Written opinion for PCT Application No. PCT/JP2014/002665.

Fabien Hermenier et al. "Entropy: a Consolidation Manager for Clusters" Proceedings of the 2009 ACM SIGPLAN/SIGOPS international conference on Virtual execution environments, pp. 41-50, Mar. 11-13, 2009, Section 3.2 Cited in the Specification.

Japanese Office Action for JP Application No. 2015-519630 dated Aug. 1, 2017 with English Translation.

* cited by examiner

REQUEST FOR ARRANGEMENT OF VIRTUAL MACHINES
20
10
80
30A
30B
30C
40A
40B
40C
50A
50B
50C

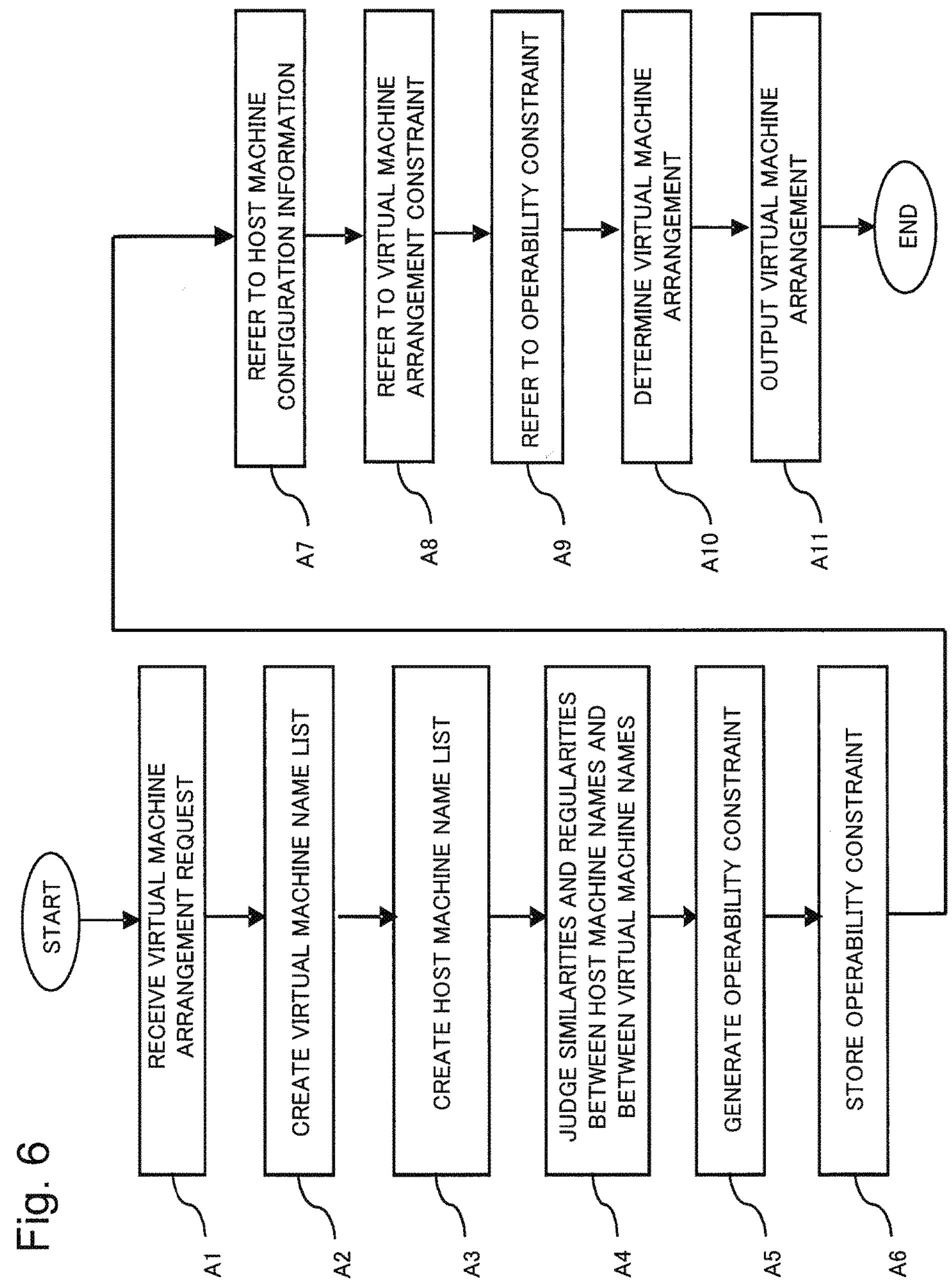
Fig. 6
START
RECEIVE VIRTUAL MACHINE ARRANGEMENT REQUEST
A1
CREATE VIRTUAL MACHINE NAME LIST
A2
CREATE HOST MACHINE NAME LIST
A3
JUDGE SIMILARITIES AND REGULARITIES BETWEEN HOST MACHINE NAMES AND BETWEEN VIRTUAL MACHINE NAMES
A4
GENERATE OPERABILITY CONSTRAINT
A5
STORE OPERABILITY CONSTRAINT
A6
REFER TO HOST MACHINE CONFIGURATION INFORMATION
A7
REFER TO VIRTUAL MACHINE ARRANGEMENT CONSTRAINT
A8
REFER TO OPERABILITY CONSTRAINT
A9
DETERMINE VIRTUAL MACHINE ARRANGEMENT
A10
OUTPUT VIRTUAL MACHINE ARRANGEMENT
A11
END

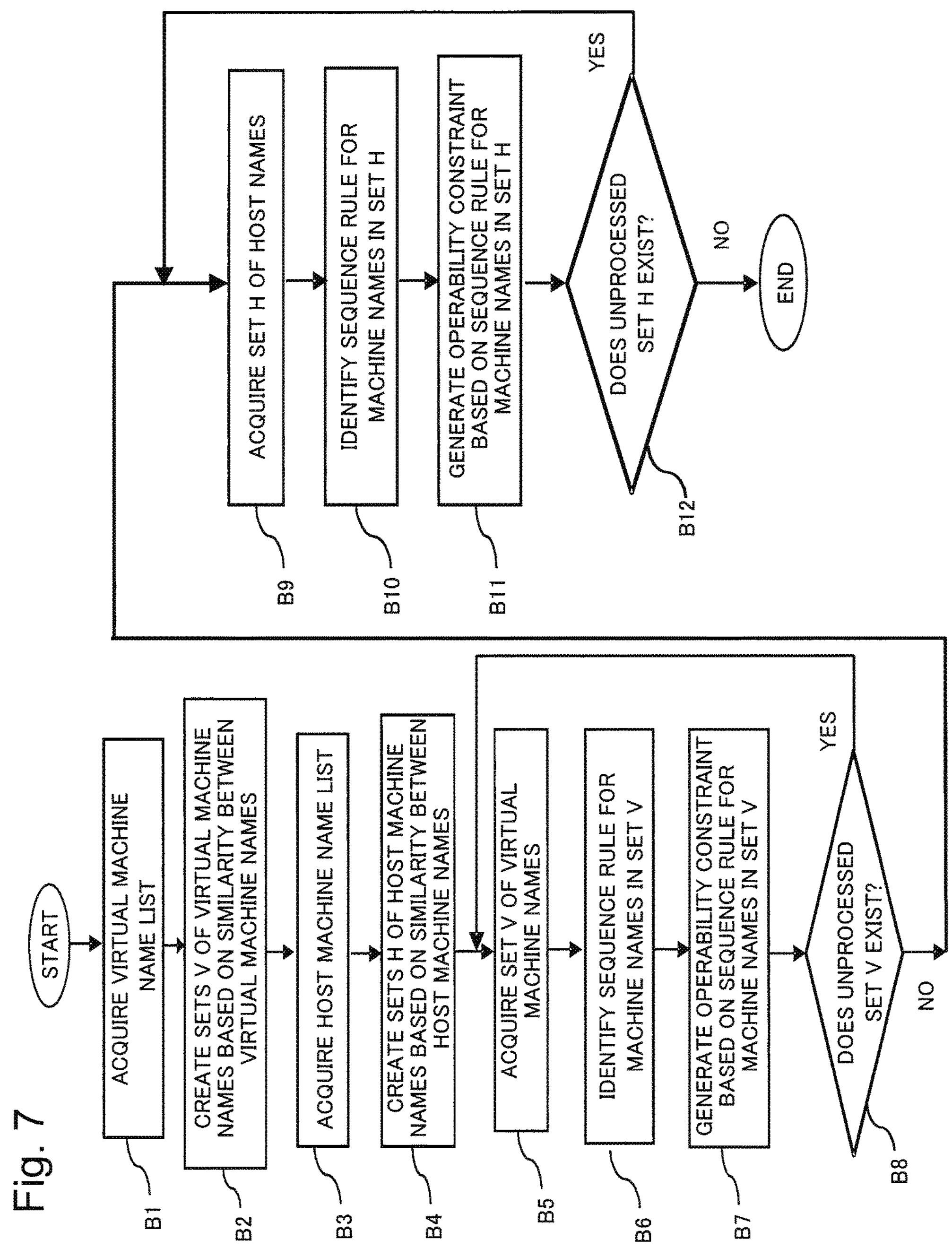
Fig. 7
START
ACQUIRE VIRTUAL MACHINE NAME LIST
B1
CREATE SETS V OF VIRTUAL MACHINE NAMES BASED ON SIMILARITY BETWEEN VIRTUAL MACHINE NAMES
B2
ACQUIRE HOST MACHINE NAME LIST
B3
CREATE SETS H OF HOST MACHINE NAMES BASED ON SIMILARITY BETWEEN HOST MACHINE NAMES
B4
ACQUIRE SET V OF VIRTUAL MACHINE NAMES
B5
IDENTIFY SEQUENCE RULE FOR MACHINE NAMES IN SET V
B6
GENERATE OPERABILITY CONSTRAINT BASED ON SEQUENCE RULE FOR MACHINE NAMES IN SET V
B7
DOES UNPROCESSED SET V EXIST?
B8
YES
NO
ACQUIRE SET H OF HOST NAMES
B9
IDENTIFY SEQUENCE RULE FOR MACHINE NAMES IN SET H
B10
GENERATE OPERABILITY CONSTRAINT BASED ON SEQUENCE RULE FOR MACHINE NAMES IN SET H
B11
DOES UNPROCESSED SET H EXIST?
B12
YES
NO
END

Fig. 9A

| HOST MACHINE NAME |
| --- |
| DC1－0101－001 |
| DC1－0101－002 |
| DC1－0101－003 |
| DC1－0101－004 |
| DC1－0305－010 |
| DC1－0305－011 |

Fig. 9B

| VIRTUAL MACHINE NAME |
|---|
| SRV1−WEB1−001 |
| SRV1−WEB1−002 |
| SRV1−WEB1−003 |
| SRV1−WEB1−004 |
| SRV1−APP1−001 |
| SRV1−APP1−002 |
| SRV1−DB1−001 |
| SRV2−COM1−001 |
| SRV2−COM1−002 |
| SRV2−COM2−001 |
| SRV2−COM3−001 |

Fig. 10A

| CPU | Core(s) | Memory |
| --- | --- | --- |
| DC1−0101−* | 4 | 12GB |
| DC1−0305−* | 4 | 12GB |

Fig. 10B

| CPU | Core(s) | Memory |
|---|---|---|
| SRV1—WEB—* | 1 | 2GB |
| SRV1—APP—* | 2 | 5GB |
| SRV1—DB—* | 2 | 10GB |
| SRV2—COM1—* | 1 | 6GB |
| SRV2—COM2—* | 2 | 4GB |
| SRV2—COM3—* | 2 | 8GB |

Fig. 11

| HOST MACHINE NAME | VIRTUAL MACHINE NAME | | |
|---|---|---|---|
| DC1−0101−001 | SRV1−APP1−002 | SRV2−COM2−001 | |
| DC1−0101−002 | SRV1−DB−001 | | |
| DC1−0101−003 | SRV1−APP1−001 | SRV2−COM1−002 | |
| DC1−0101−004 | SRV1−WEB1−003 | SRV1−WEB1−004 | SRV2−COM3−001 |
| DC1−0305−010 | SRV1−WEB1−001 | SRV1−WEB1−002 | SRV2−COM1−001 |
| DC1−0305−011 | | | |

Fig. 14

| HOST MACHINE NAME | VIRTUAL MACHINE NAME | | |
|---|---|---|---|
| DC1−0101−001 | SRV1−WEB1−001 | SRV1−WEB1−002 | SRV1−WEB1−003 |
| DC1−0101−002 | SRV1−WEB1−004 | SRV1−DB1−001 | |
| DC1−0101−003 | SRV1−APP1−001 | SRV1−APP1−002 | |
| DC1−0101−004 | | | |
| DC1−0305−010 | SRV2−COM1−001 | SRV2−COM1−002 | |
| DC1−0305−011 | SRV2−COM2−001 | SRV2−COM3−001 | |

60 VIRTUAL MACHINE CONTROL DEVICE
REQUEST FOR ARRANGEMENT OF VIRTUAL MACHINES
63
INPUTTING UNIT
61
GENERATING UNIT
62
DETERMINING UNIT
66
OUTPUTTING UNIT
64
EXTRACTING UNIT
65 STORING UNIT
VIRTUAL MACHINE ARRANGEMENT INFORMATION
654
ARRANGEMENT CONSTRAINT INFORMATION
652
OPERABILITY CONSTRAINT INFORMATION
653

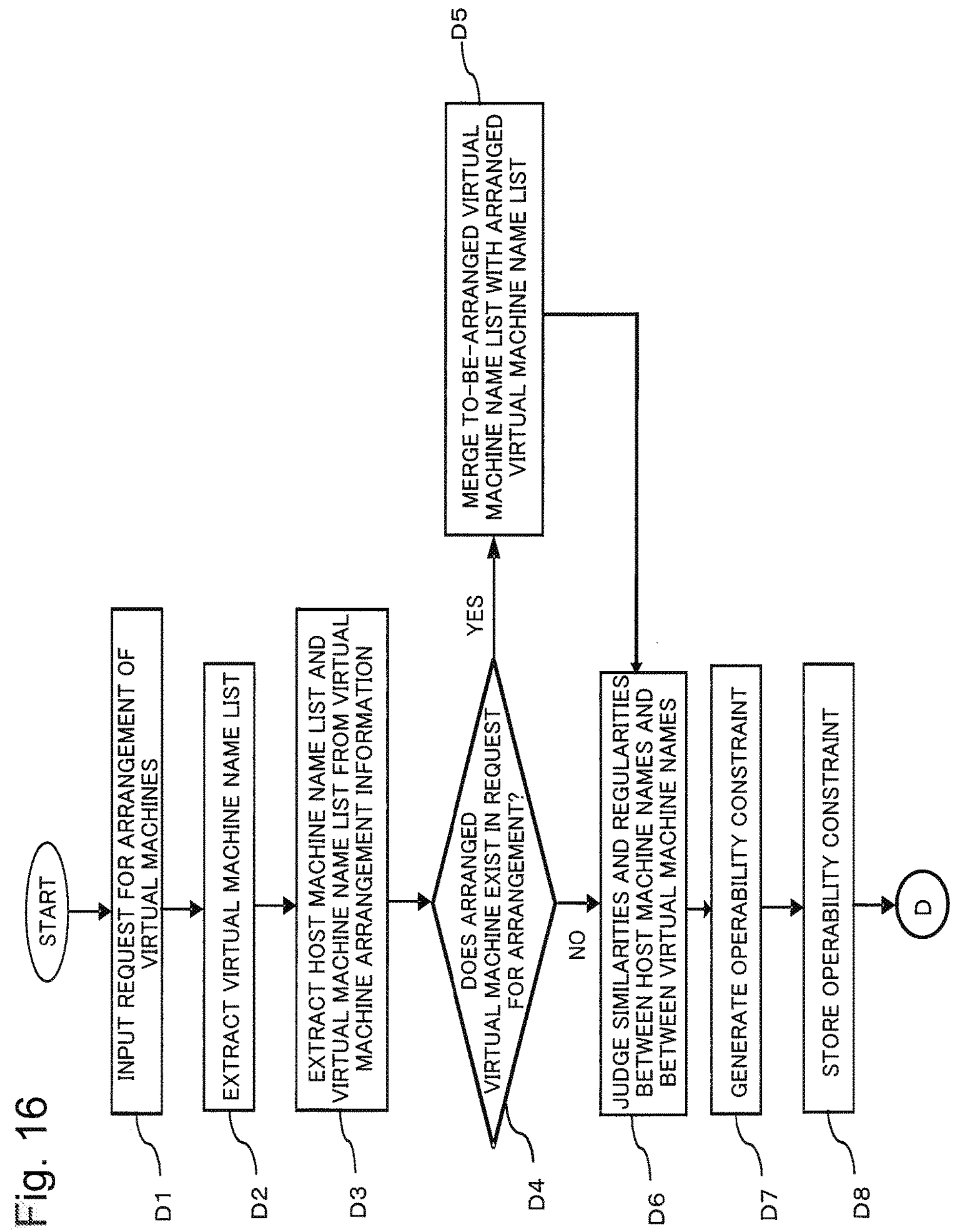
Fig. 16
START
INPUT REQUEST FOR ARRANGEMENT OF VIRTUAL MACHINES
D1
EXTRACT VIRTUAL MACHINE NAME LIST
D2
EXTRACT HOST MACHINE NAME LIST AND VIRTUAL MACHINE NAME LIST FROM VIRTUAL MACHINE ARRANGEMENT INFORMATION
D3
DOES ARRANGED VIRTUAL MACHINE EXIST IN REQUEST FOR ARRANGEMENT?
D4
YES
NO
MERGE TO-BE-ARRANGED VIRTUAL MACHINE NAME LIST WITH ARRANGED VIRTUAL MACHINE NAME LIST
D5
JUDGE SIMILARITIES AND REGULARITIES BETWEEN HOST MACHINE NAMES AND BETWEEN VIRTUAL MACHINE NAMES
D6
GENERATE OPERABILITY CONSTRAINT
D7
STORE OPERABILITY CONSTRAINT
D8
D

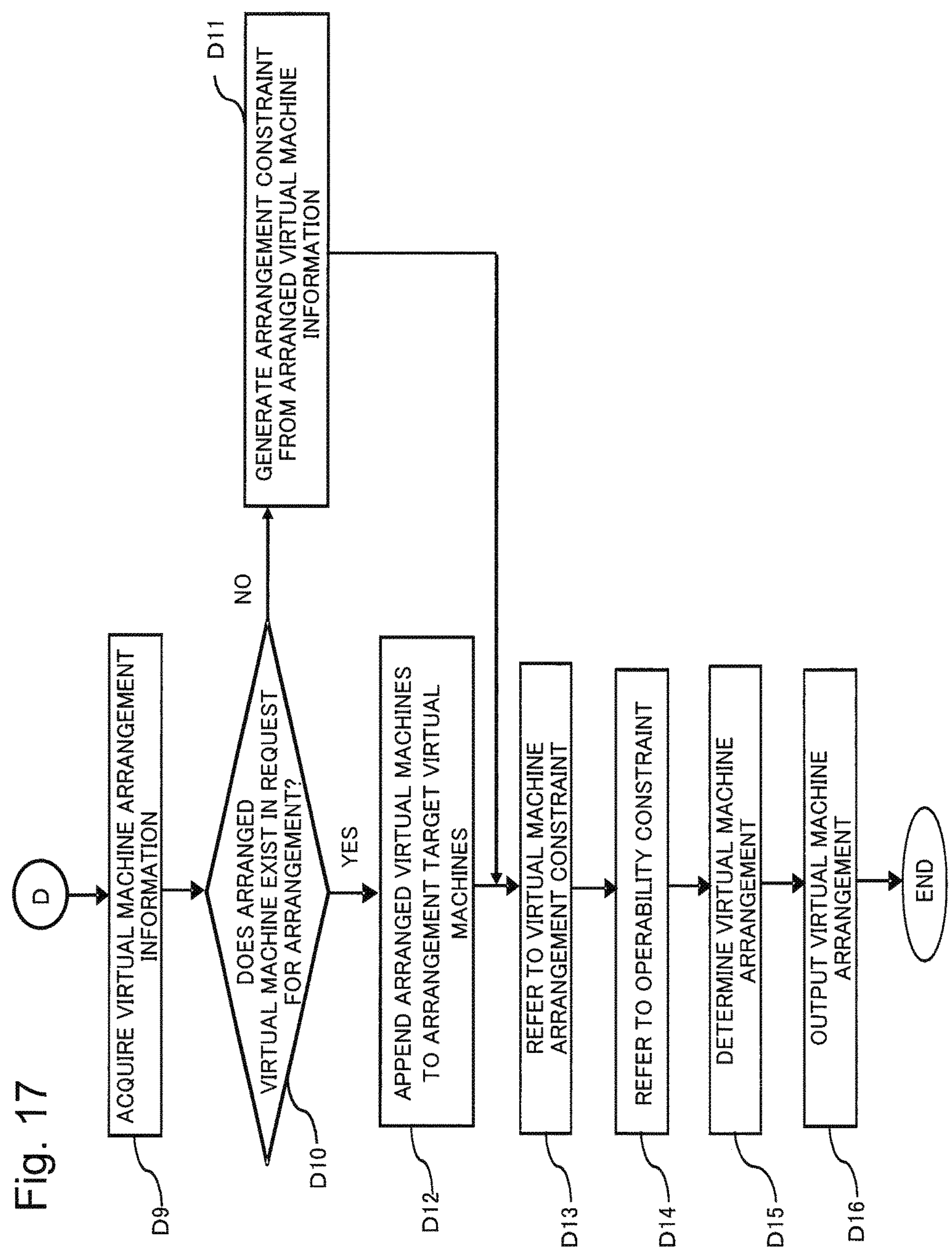
Fig. 17
D
ACQUIRE VIRTUAL MACHINE ARRANGEMENT INFORMATION
D9
DOES ARRANGED VIRTUAL MACHINE EXIST IN REQUEST FOR ARRANGEMENT?
D10
NO
GENERATE ARRANGEMENT CONSTRAINT FROM ARRANGED VIRTUAL MACHINE INFORMATION
D11
YES
APPEND ARRANGED VIRTUAL MACHINES TO ARRANGEMENT TARGET VIRTUAL MACHINES
D12
REFER TO VIRTUAL MACHINE ARRANGEMENT CONSTRAINT
D13
REFER TO OPERABILITY CONSTRAINT
D14
DETERMINE VIRTUAL MACHINE ARRANGEMENT
D15
OUTPUT VIRTUAL MACHINE ARRANGEMENT
D16
END 70 VIRTUAL MACHINE CONTROL DEVICE
REQUEST FOR ARRANGEMENT OF VIRTUAL MACHINES
73
INPUTTING UNIT
71
GENERATING UNIT
77
SEARCHING UNIT
78
SCORE CALCULATING UNIT
79
SELECTING UNIT
76
OUTPUTTING UNIT
74
EXTRACTING UNIT
HOST MACHINE CONFIGURATION INFORMATION
ARRANGEMENT CONSTRAINT INFORMATION
OPERABILITY CONSTRAINT INFORMATION
751
752
753
75 STORING UNIT

VIRTUAL-MACHINE CONTROL DEVICE, VIRTUAL-MACHINE CONTROL METHOD, COMPUTER-READABLE RECORDING MEDIUM RECORDING PROGRAM FOR VIRTUAL-MACHINE CONTROL METHOD, AND DATA CENTER

This application is a National Stage Entry of PCT/JP2014/002665 filed on May 21, 2014, which claims priority from Japanese Patent Application 2013-112906 filed on May 29, 2013, the contents of all of which are incorporated herein by reference, in their entirety.

TECHNICAL FIELD

The present invention relates to a virtual machine control device, a virtual machine control method, a computer-readable recording medium recording the program, and a data center, and, more particularly, to the control of arrangement of virtual machines on host machines.

BACKGROUND ART

Server virtualization is a technology to divide a server into a plurality of virtual computers (hereinafter, referred to as virtual machines) and make different OSes (Operating Systems) or pieces of application software run on the respective virtual machines. By using such a technology, compared with a case of using a plurality of servers each of which is dedicated to each OS or application, it becomes possible to save the effort of managing physical resources and flexibly allocate the resources in accordance with demands.

As the server virtualization technology is spreading, examples of server integration in a data center have increased. Arranging a plurality of virtual machines on a small number of servers causes use efficiency of the servers to increase, and, in consequence, power consumption or environmental burden of a data center to be reduced.

On the other hand, computer resources, such as a CPU (Central Processing Unit) and a memory, available for servers are limited. Thus, arrangements of virtual machines are determined in such a way that the processing capacity of servers is not surpassed. To increase efficiency in server integration, virtual machine arrangement determination that determines on which server the virtual machines are operated becomes important.

Depending on the types of applications running on virtual machines, there is a case in which competition for resources on servers between virtual machines takes place. Thus, it is required to devise a measure to determine an arrangement of virtual machines in such a way as not to cause a problem to the performance of the applications. A method to determine an appropriate virtual machine arrangement with a reflection of such a resource constraint and relations between virtual machines have gathered attention recent years as a key to raising the efficiency of a data center.

Examples of arrangement technologies of virtual machines are disclosed in PTLs 1 to 4 and NPL 1.

PTL 1 discloses a technology that, in arranging virtual machines on host machine, determines an optimum arrangement of the virtual machines based on a capacity limitation of the host machines. The determination of arrangement uses power efficiency as an indicator.

PTL 2 discloses a technology that, with a reflection of a load on and the power efficiency of servers and virtual machines, determines a virtual machine arrangement based on various constraint conditions.

PTL 3 discloses a technology that, in arranging a plurality of virtual machines on servers, determines a virtual machine arrangement that avoids competition for resources by calculating a degree of appropriateness of a combination of virtual machines.

PTL 4 discloses a technology that, in arranging a plurality of virtual machines on servers, enables an allocation of resources of physical machines from the view of operations.

Further, NPL 1 proposes the determination of arrangement of virtual machines with a reflection of various constraints on virtual machine arrangement by use of a constraint programming approach. Since designing constraints concerning arrangement into an algorithm is not required, the determination of arrangement of virtual machines using a constraint programming approach excels in flexibility and expandability. For example, when determining an arrangement of virtual machines with a reflection of new constraints is required, it is possible to deal with the requirement, without revising an existing algorithm, by only adding constraints that can be handled by the constraint programming approach.

CITATION LIST

Patent Literature

[PTL 1] Japanese Unexamined Patent Application Publication (Translation of PCT Application) No. 2012-523620

[PTL 2] Japanese Unexamined Patent Application Publication No. 2011-013822

[PTL 3] International Publication No. 2007/136021

[PTL 4] Japanese Unexamined Patent Application Publication No.

Non Patent Literature

[NPL 1] Fabien Hermenier et al. "Entropy: a Consolidation Manager for Clusters" Proceedings of the 2009 ACM SIGPLAN/SIGOPS International Conference on Virtual Execution Environments, Pages 41-50, Mar. 11-13, 2009, Section 3.2

SUMMARY OF INVENTION

Technical Problem

In operational management of a system, it is important for an operations manager to grasp a configuration and state of the system appropriately.

The arrangement technologies disclosed in PTLs 1 to 4 and NPL 1 are principally aimed at optimizing performance, cost, or resource use of the whole of a data center. However, an arrangement of virtual machines that is determined with such an aim does not always lead to an arrangement that facilitates the process of operational management.

For example, when, in an application service provided by cooperation between a plurality of virtual machines, a portion of the virtual machines are arranged in a decentralized manner at physically distant locations, it becomes difficult for an operations manager to grasp relations between the arranged virtual machines. When a plurality of virtual machines that compose an application service are arranged in a decentralized manner over a physically large area, it becomes difficult for an operations manager to manage the virtual machines by grasping the configuration of the application service.

As described above, there has been no example of the arrangement control of virtual machines with a reflection of the operational management of a system, and the achievement of the arrangement control is expected.

OBJECT OF INVENTION

An object of the present invention is to provide a virtual machine control device, a virtual machine control method, and a computer-readable recording medium recording a program to carry out the method that are capable of determining an arrangement of virtual machines with a reflection of the operational management of a system.

Solution to Problem

A virtual machine control device according to one exemplary embodiment of the present invention, the virtual machine control device includes:

a generating unit configured to generate an operability constraint for a virtual machine is to be arranged, based on a virtual machine name list of the virtual machine and a host machine name list of a host machine capable to arrange the virtual machine; and a determining unit configured to determine an arrangement of the virtual machine is to be arranged, based on a constraint including the generated operability constraint, wherein the host machine name includes location information of the host machine, and the virtual machine name includes information of component that composes an application service.

A virtual machine control method according to one exemplary embodiment of the present invention, the virtual machine control method includes:

generating an operability constraint for a virtual machine is to be arranged, based on a virtual machine name list of the virtual machine and a host machine name list of a host machine capable to arrange the virtual machine; and determining an arrangement of the virtual machine is to be arranged, based on a constraint including the generated operability constraint, wherein the host machine name includes location information of the host machine, and the virtual machine name includes information of component that composes an application service.

A non-transitory computer-readable recording medium recording a virtual machine control program according to one exemplary embodiment of the present invention, the program causes a computer to execute:

a process of generating an operability constraint for a virtual machine is to be arranged, based on a virtual machine name list of the virtual machine and a host machine name list of a host machine capable to arrange the virtual machine; and a process of determining an arrangement of the virtual machine is to be arranged, based on a constraint including the generated operability constraint, wherein the host machine name includes location information of the host machine, and the virtual machine name includes information of component that composes an application service.

A data center according to one exemplary embodiment of the present invention, the data center includes a virtual machine control device and a host machine. The virtual machine control device includes:

a generating unit configured to generate an operability constraint for a virtual machine is to be arranged, based on a virtual machine name list of the virtual machine and a host machine name list of a host machine capable to arrange the virtual machine; and a determining unit configured to determine an arrangement of the virtual machine is to be arranged, based on a constraint including the generated operability constraint, wherein the host machine name includes location information of the host machine, and the virtual machine name includes information of component that composes an application service.

Advantageous Effects of Invention

With the present invention, it is possible to provide a virtual machine control device, a virtual machine control method, and a computer-readable recording medium recording a program to carry out the method that are capable of determining an arrangement of virtual machines with a reflection of the operational management of a system.

BRIEF DESCRIPTION OF DRAWINGS

FIG. 6 is a flowchart illustrating an operation of the virtual machine control device in the second exemplary embodiment of the present invention;

FIG. 7 is a flowchart illustrating an operation of a determining unit of the virtual machine control device in the second exemplary embodiment;

FIG. 9A is a diagram illustrating an example of a host machine name list in the second exemplary embodiment of the present invention;

FIG. 9B is a diagram illustrating an example of a virtual machine name list in the second exemplary embodiment of the present invention;

FIG. 10A is a diagram illustrating an example of resource constraints of host machines in the second exemplary embodiment of the present invention;

FIG. 10B is a diagram illustrating an example of resource constraints of virtual machines in the second exemplary embodiment of the present invention;

FIG. 11 is a diagram illustrating an example of virtual machine arrangement information based on resource constraints, which is a comparative example;

FIG. 14 is a diagram illustrating an example of virtual machine arrangement information that is determined with a reflection of operability constraints;

FIG. 16 is a flowchart illustrating an operation of the virtual machine control device, which is the third exemplary embodiment of the present invention;

FIG. 17 is a flowchart illustrating the operation of the virtual machine control device, which is the third exemplary embodiment of the present invention;

DESCRIPTION OF EMBODIMENTS

Exemplary embodiments of the present invention will be described in detail with reference to the accompanying drawings.

A virtual machine in the exemplary embodiments is a logical machine that operates in a physical computer by using a virtualization technology, is able to have a standalone OS, and operates in a similar manner to a physical computer (hereinafter, referred to as a host machine).

Regarding resources required for operations of virtual machines, a plurality of virtual machines that operate in a host machine share resources of the host machine. Each virtual machine executes an application or the like by using allocated virtual resources.

<Data Center>

Figure 1:
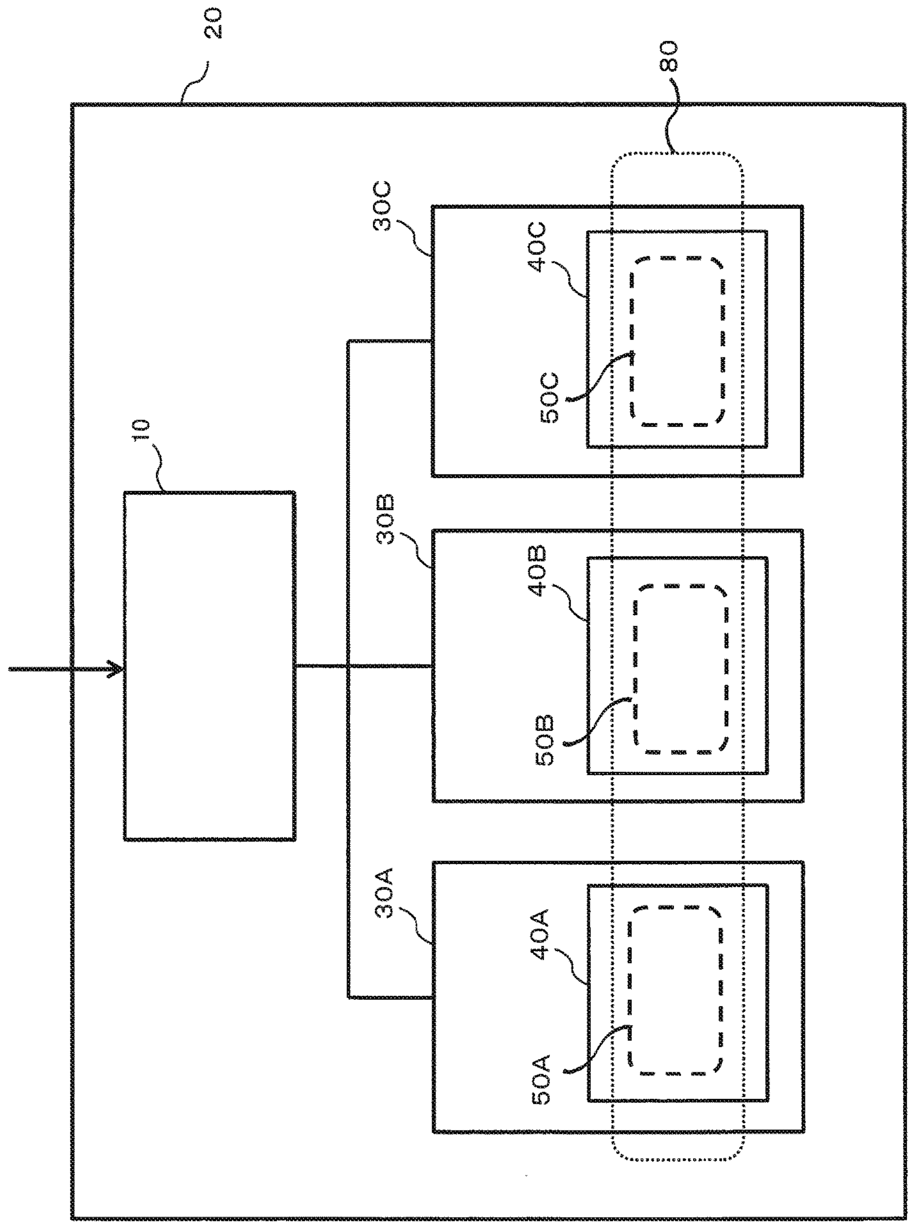
FIG. 1 is a schematic view of a virtual machine control device, which is an exemplary embodiment of the present invention, being applied to a data center.

FIG. 1 is a schematic view of an example in which a virtual machine control device, which is an exemplary embodiment of the present invention, is applied to a data center.

As illustrated in the drawing, a data center 20 includes a virtual machine control device 10 and host machines 30A, 30B, and 30C. Based on a request for arrangement of virtual machines, the virtual machine control device 10 determines an arrangement of the virtual machine on the host machines 30A, 30B, and 30C with a reflection of an arrangement constraint on the virtual machines.

FIG. 1 illustrates an example in which, by the virtual machine control device 10 determining an arrangement of virtual machines, virtual machines 40A, 40B, and 40C are arranged on each of the host machines 30A, 30B, and 30C. In the drawing, an application service 80 is also exemplified that operates by cooperation between a plurality of virtual machines 40A, 40B, and 40C. By executing components composing the application service 80 (individual programs 50A, 50B, and 50C) on the virtual machines 40A, 40B, and 40C, services of the application service 80 are provided.

<First Exemplary Embodiment>

Next, a virtual machine arrangement control unit 5 used in the virtual machine control device 10, which is a first exemplary embodiment of the present invention, will be described in detail with reference to the accompanying drawings.

[Description of Configuration]

Figure 2:
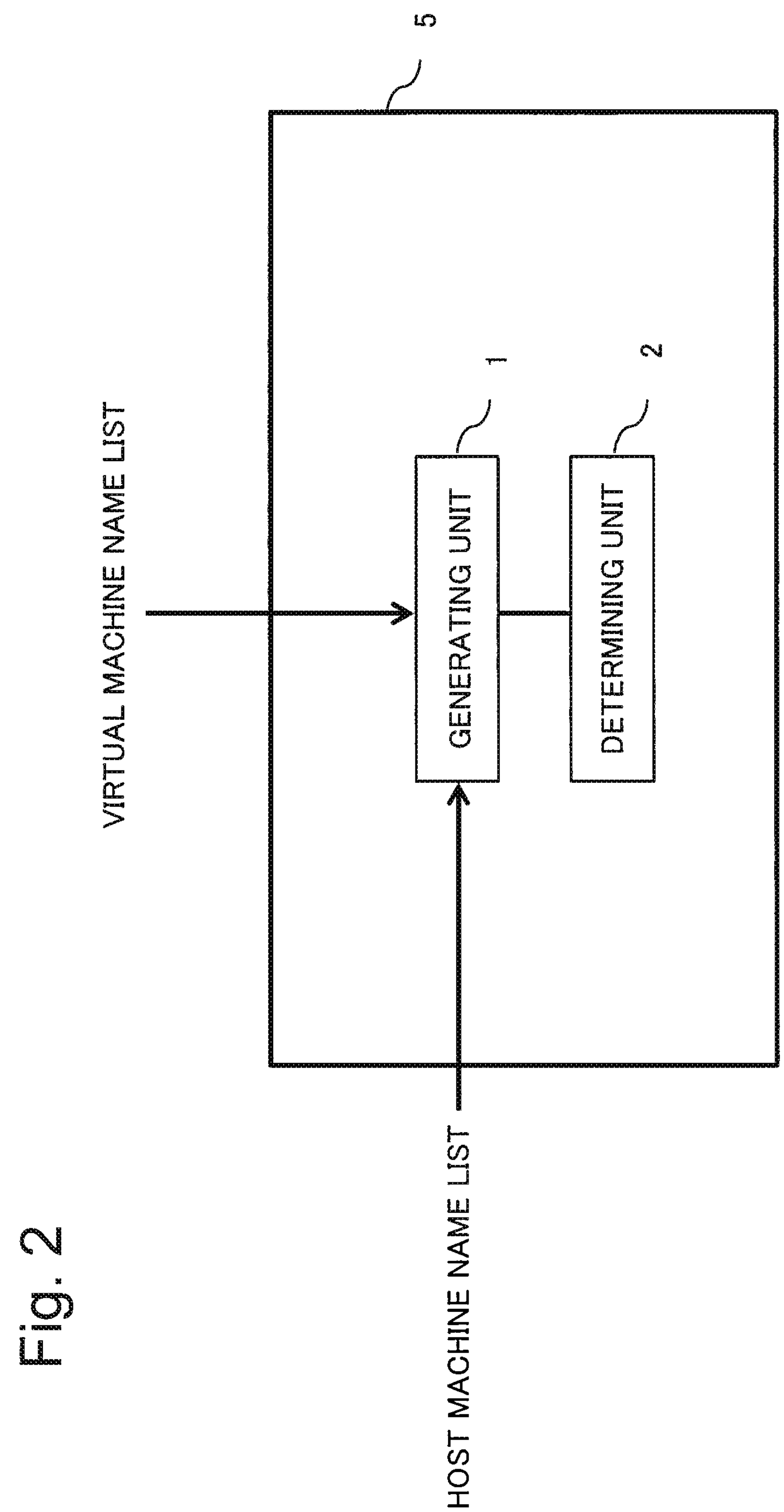
FIG. 2 is a block diagram illustrating a configuration of the virtual machine control device, which is the first exemplary embodiment of the present invention.

FIG. 2 is a block diagram illustrating a configuration of the virtual machine arrangement control unit 5 used in the virtual machine control device 10 of the first exemplary embodiment of the present invention. The virtual machine arrangement control unit 5 of the first exemplary embodiment includes a generating unit 1 and a determining unit 2.

As illustrated in the drawing, the generating unit 1 of the virtual machine arrangement control unit 5 inputs, as input data, a list in which the names of virtual machines that are to be arranged are described (hereinafter, referred to as a virtual machine name list) and a list in which the names of host machines on which the virtual machines can be arranged are described (hereinafter, referred to as a host machine name list). Further, based on information in the lists, the generating unit 1 generates an operability constraint(s) to determine an arrangement of the virtual machines.

To each of the host machine names and virtual machine names described in the lists, the name of a host machine or virtual machine, including identification information thereof, is given. Further, to each of the host machine names and each of the virtual machine names, location information of the host machine in the data center and information on components composing an application service that the virtual machine executes are given, respectively, as operational management information.

The operability constraint is a constraint that facilitates a grasp of relations between host machines and virtual machines by an operations manager after determining an arrangement of the virtual machines. Examples of the operability constraint include a set constraint and a sequence constraint. The set constraint stipulates a group of virtual machines arranged together, and one example of the set constraint is that "a set of virtual machines $V_1\{v_1, v_2, v_3\}$ are arranged in such a way as to be contained in any one of sets of host machines $H_1\{h_1, h_2\}$, $H^2\{h_3, h_4\}$, and $H_3\{h_5, h_6\}$". Each of the above reference signs $v_1$ to $v_5$ and each of the above reference signs $h_1$ to $h_6$ denote a virtual machine and a host machine, respectively. The sequence constraint is a constraint that stipulates an arrangement sequence of virtual machines, and one example of the set constraint is that "$v_1$, $v_2$, and $v_3$ are arranged on a set of host machines $H_1\{h_1, h_2\}$ in this sequence".

Referring to constraints including the operability constraint(s) generated by the generating unit 1, the determining unit 2 of the virtual machine arrangement control unit 5 determines an arrangement of virtual machines that satisfies the constraints. Constraints other than the operability constraint include, for example, a resource constraint on virtual machines or host machines, or the like.

[Description of Operation]

Figure 3:
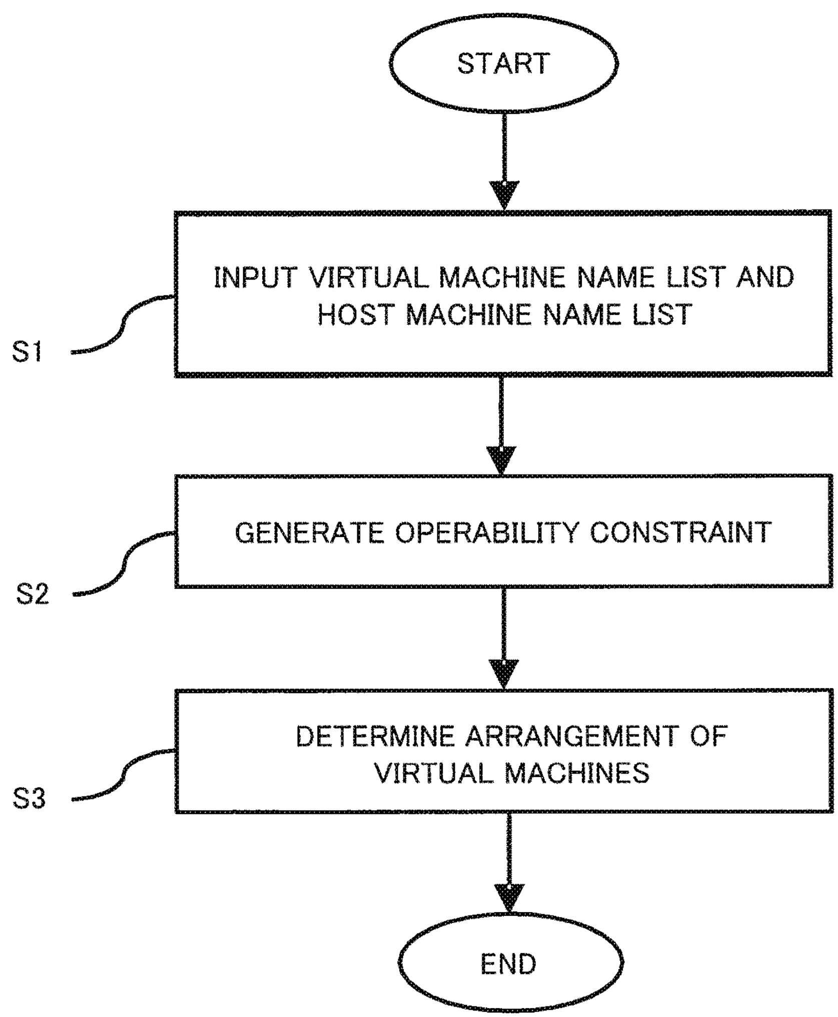
FIG. 3 is a flowchart illustrating an operation of the virtual machine control device, which is the first exemplary embodiment of the present invention.

FIG. 3 is a flowchart illustrating an operation of the virtual machine arrangement control unit 5 used in the virtual machine control device 10 of the first exemplary embodiment of the present invention.

First, the generating unit 1 of the virtual machine arrangement control unit 5 inputs, as input data, a virtual machine name list and a host machine name list (S1).

Next, based on information in the virtual machine name list and host machine name list, the generating unit 1 of the virtual machine arrangement control unit 5 generates an operability constraint(s) to determine an arrangement of the virtual machines (S2).

Referring to constraints including the operability constraint(s) generated by the generating unit 1, the determining unit 2 of the virtual machine arrangement control unit 5 determines an arrangement of the virtual machines that satisfies the constraints (S3). With this operation, the determining unit outputs information of the arrangement of the virtual machines.

[Description of Advantageous Effect]

The virtual machine arrangement control unit 5 used in the virtual machine control device 10 of the first exemplary embodiment of the present invention generates an operability constraint(s) based on host machine names and virtual machine names in which operational management information is reflected, and determines an arrangement of the virtual machines by using the generated operability constraint(s). With this configuration, the virtual machine arrangement control unit 5 used in the virtual machine control device 10 in the first exemplary embodiment becomes capable of determining an arrangement of virtual machines based on operational management.

Second Exemplary Embodiment

Next, a virtual machine control device 10 of a second exemplary embodiment of the present invention will be described in detail with reference to the accompanying drawings.

[Description of Configuration]

Figure 4:
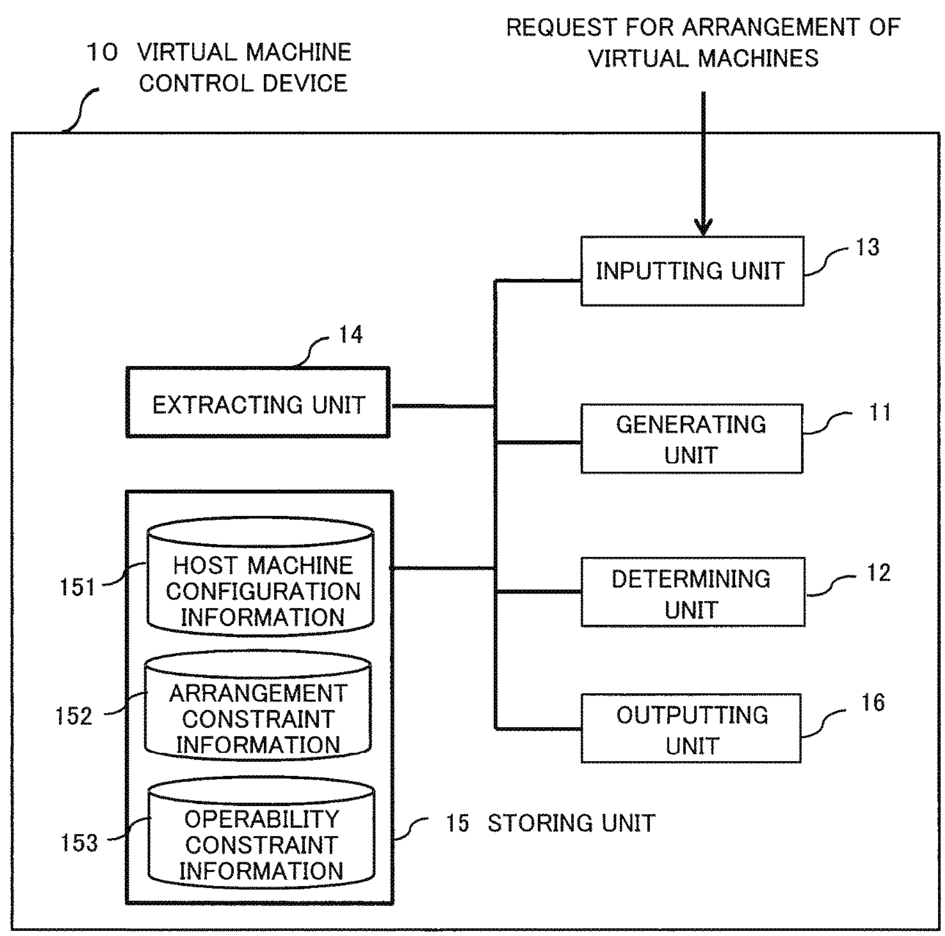
FIG. 4 is a block diagram illustrating a structure of a virtual machine control device, which is a second exemplary embodiment of the present invention.

FIG. 4 is a block diagram illustrating a configuration of the virtual machine control device 10, which is the second exemplary embodiment of the present invention. As illustrated in the drawing, the virtual machine control device 10, which is the second exemplary embodiment, includes an inputting unit 13, a generating unit 11, a determining unit 12, an extracting unit 14, a storing unit 15, and an outputting unit 16.

The inputting unit 13 of the virtual machine control device 10 transmits a virtual machine name list to the generating unit 11. Although the exemplary embodiment will be described using an example in which a virtual machine name list is described in a request for arrangement of virtual machines, the configuration is not limited to the example, and the inputting unit 13 may create a virtual machine name list based on information of a request for arrangement of virtual machines.

The storing unit 15 of the virtual machine control device 10 stores host machine configuration information 151, arrangement constraint information 152, and operability constraint information 153. The above host machine configuration information 151 is information that describes configurations of respective host machines installed in a data center. The host machine configuration information 151 is renewed responding to additional installation or removal of a host machine(s) or a change in the performance of the respective host machines in the data center. The arrangement constraint information 152 is information that describes an arrangement constraint(s) of virtual machines. The arrangement constraints include a resource constraint on host machines and virtual machines, a collocation constraint on combinations of virtual machines, and the like.

The above resource constraint is information of resources with which host machines are able to provide virtual machines (for example, four CPU cores are available on a host machine, the total amount of memory that a host machine can provide is 16 GB (Giga Byte), or the like). Another resource constraint is information of resources that virtual machines require (the host machine on which a virtual machine A can be arranged is limited to a host machine that has a 10 Gbit/sec network interface).

The above collocation constraint stipulates, for example, that "the virtual machine A and the virtual machine B are arranged on different host machines", or "the virtual machine C is arranged on the host machine X or the host machine Y". Another collocation constraint stipulates, for example, that "the virtual machine D is arranged on the host machine Z, which is connected to a network".

The operability constraint information 153 is constraint information that describes an operability constraint(s) generated by the generating unit 11.

The extracting unit 14 of the virtual machine control device 10 extracts host machines on which the virtual machines can be arranged based on the host machine configuration information 151 in the storing unit 15, and transmits the extracted host machines to the generating unit 11 as a host machine name list. Although the exemplary embodiment will be described using an example in which the extracting unit 14 transmits a host machine name list to the generating unit 11, the configuration is not limited to the example, and the generating unit 11 may read a host machine name list stored in the storing unit 15.

The generating unit 11 of the virtual machine control device 10 generates an operability constraint(s) referring to the input virtual machine name list and host machine name list.

Referring to the host machine configuration information 151, arrangement constraint information 152, and operability constraint information 153 stored in the storing unit 15, the determining unit 12 determines virtual machine arrangement information that satisfies prescribed constraints.

The outputting unit 16 outputs the virtual machine arrangement information determined by the determining unit 12 to host machines that are designated as arrangement destinations of the virtual machines.

A specific configuration of the generating unit 11 of the virtual machine control device 10 in the second exemplary embodiment will be described in detail below by using FIG. 5.

Figure 5:
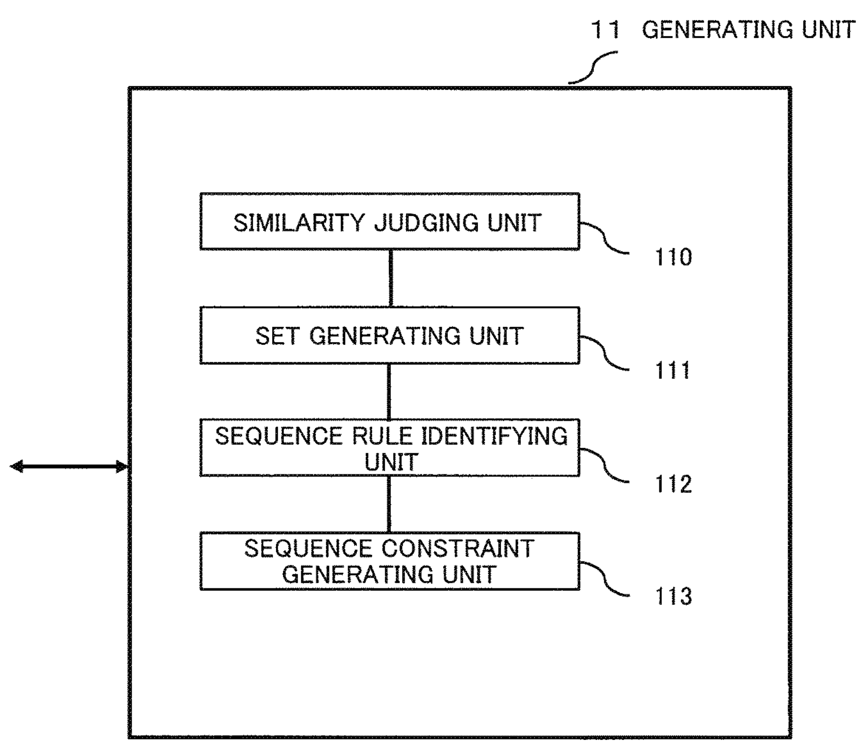
FIG. 5 is a block diagram illustrating a configuration of a generating unit of the virtual machine control device in the second exemplary embodiment.

FIG. 5 is a block diagram illustrating an example of a configuration of the generating unit 11 of the virtual machine control device 10.

The generating unit 11 includes a similarity judging unit 110, a set creating unit 111, a sequence rule identifying unit 112, and a sequence constraint generating unit 113.

For the host machine name list and virtual machine name list input to the generating unit 11, the similarity judging unit 110 judges respective similarities between host machine names and between virtual machine names in the lists. Specific operations to judge respective similarities between host machine names and between virtual machine names will be described later.

Based on the similarity between host machine names or virtual machine names, which has been judged by the similarity judging unit 110, the set creating unit 111 creates sets H of host machine names or sets V of virtual machine names.

A set H of host machine names is denoted by $H=\{h_1, h_2, \ldots, h_n\}$ [n is an integer of 1 or greater]. For example, a set $H\{h_1\}$ indicates that a set H of host machine names has a host machine $h_1$, and a set $H\{h_2, h_3, h_4\}$ indicates that a set H of host machine names has three host machines $h_2$, $h_3$, and $h_4$. When a plurality of sets of host machine names, such as H1 and H2, exist, host machines $h_1, h_2, \ldots$, and $h_n$ are created exclusively for each set of host machine names. A set V of virtual machine names is denoted by $V=\{v_1, v_2, \ldots, v_t\}$ [t is an integer of 1 or greater]. For example, a set $V\{v_1, v_2, v_3\}$ indicates that a set V of virtual machine names has three virtual machines $v_1$, $v_2$, and $v_3$. When a plurality of sets of virtual machine names, such as $V_1$ and $V_2$, exist, virtual machines $v_1, v_2, \ldots$, and $v_t$ are created exclusively for each set of virtual machine names.

Next, for the created sets H of host machine names or sets V of virtual machine names, the sequence rule identifying unit 112 identifies a sequence rule for host machine names or virtual machine names in each set.

Last, the sequence constraint generating unit 113 generates an arrangement constraint(s) to reflect the sequence rule(s) for arrangement into virtual machine arrangement.

[Description of Operation]

Next, with reference to FIG. 6, an operation of the virtual machine control device, which is the second exemplary embodiment, will be described in detail.

FIG. 6 is a flowchart illustrating an example of an operation of the virtual machine control device 10.

First, the inputting unit 13 of the virtual machine control device 10 receives a request for arrangement of virtual machines in which information of virtual machines that are to be arranged is described (A1).

The inputting unit 13 creates a virtual machine name list from the request for arrangement of virtual machines and transmits the created virtual machine name list to the generating unit 11 (A2).

Next, the extracting unit 14 creates a host machine name list, which lists the names of host machines on which the virtual machines can be arranged, from the host machine configuration information 151 in the storing unit 15 and transmits the created host machine name list to the generating unit 11 (A3).

Based on information in the host machine name list and virtual machine name list, the generating unit 11 identifies respective similarities and regularities between the host machine names and between the virtual machine names (A4).

Next, the generating unit 11 generates an operability constraint(s) to determine an arrangement of the virtual machines based on the identified "sets of similar names" and "sequence rule(s) for names in the sets" (A5), and stores the generated operability constraint(s) in the storing unit 15 (A6).

The operability constraint is one of arrangement constraints to facilitate a grasp of relations between virtual machines and host machines after arrangement determination by an operations manager of the data center. Examples of the arrangement constraint include a set constraint that "a set $V_1$ of virtual machine names are arranged in such a way as to be contained in any one of sets $H_1$, $H_2$, and $H_3$ of host machine names". The examples of the arrangement constraint also include a sequence constraint that "virtual machines $v_1$, $v_2$, and $v_3$ are arranged on a set $H1\{h_1, h_2, h_3\}$ of host machine names in this sequence".

Next, the determining unit 12 refers to the host machine configuration information 151, arrangement constraint information 152, and operability constraint information 153 in the storing unit 15 (A7 to A9). The host machine configuration information 151 is information indicating configurations of host machines that become arrangement destinations of the virtual machines. In the exemplary embodiment, the host machines are machines in the data center.

The determining unit 12 determines a virtual machine arrangement that satisfies the prescribed constraints through processing to solve a constraint programming problem (A10). It is possible to apply known technologies to the determination of an arrangement of virtual machines through constraint programming (for example, refer to NPL 1).

The outputting unit 16 outputs the virtual machine arrangement information determined by the determining unit 12 to host machines that are designated as arrangement destinations (A11).

Next, an operation of the generating unit 11 of the virtual machine control device 10, which is the second exemplary embodiment, will be described in detail with reference to FIGS. 7 and 8.

FIG. 7 is a flowchart illustrating an operation by which the generating unit 11, which has the configuration illustrated in FIG. 5, generates an operability constraint(s) based on a sequence rule(s).

First, the similarity judging unit 110 of the generating unit 11 acquires a virtual machine name list (B1), and judges similarities between virtual machine names from the acquired virtual machine name list.

Next, after the judgment by the similarity judging unit 110, the set creating unit 111 of the generating unit 11 creates sets V of virtual machine names that are similar to each other within the virtual machine name list (B2).

In the judgment of similarities between virtual machine names by the similarity judging unit 110, a method is used that searches a match between character substrings in character strings indicating virtual machine names and determines a similarity based on the length of matching character strings. The judgement of similarities in virtual machine names is not limited to the above method, and a method may be used that measures the distance between two character strings, such as the Levenshtein distance, to calculate a similarity and regards virtual machine names with a high degree of similarity therebetween as a set.

Next, the similarity judging unit 110 acquires a host machine name list (B3), and judges similarities between host machine names from the acquired host machine name list.

Next, after the judgment by the similarity judging unit 110, the set creating unit 111 creates sets H of host machine names that are similar to each other within the host machine name list (B4).

Next, the sequence rule identifying unit 112 of the generating unit 11 acquires each set V of virtual machine names (B5), and identifies a sequence rule for the virtual machine names (B6).

The sequence rule includes a rule of sequencing numerical values in ascending order, such as from 1 to 2 to 3, and a rule of alphabetical order, such as from A to B to C. Simply sequencing virtual machine names included in a set in a dictionary order may also be considered as a sequence rule.

The sequence constraint generating unit 113 of the generating unit 11 generates an operability constraint to determine a virtual machine arrangement based on the identified sequence rule (B7). The sequence constraint generating unit 113 repeats the above processing until no unprocessed set V is left (B8).

Next, as with the respective sets V of virtual machine names, the sequence constraint generating unit 113 acquires each set H of host machine names, identifies a sequence rule for the host machine names, and creates an operability constraint to carry out virtual machine arrangement based on the sequence rule (B9 to B12).

The sequence constraint will be described by using, as an example, a case in which virtual machines $v_1$, $v_2$, and $v_3$ are arranged on respective host machines. The sequence constraint in the example is a constraint that the virtual machines are arranged on host machines $h_1$, $h_2$, and $h_3$, which are included in a set $H_1$ of host machine names, in the sequence from $h_1$ to $h_2$ to $h_3$. Since a sequence constraint creates order in an arrangement sequence, it becomes possible to determine an arrangement of virtual machines that facilitates a grasp of relations between host machines and virtual machines by an operations manager.

Figure 8:
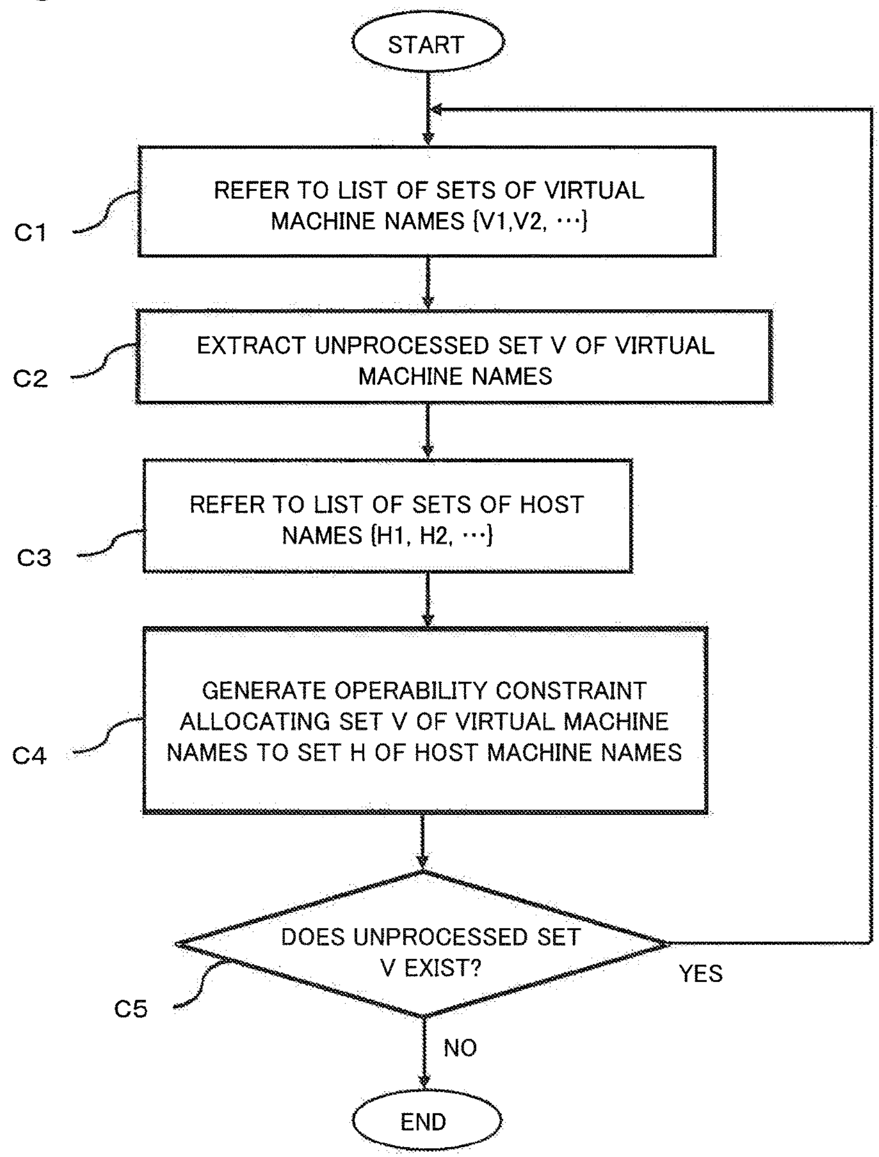
FIG. 8 is a flowchart illustrating an operation of a sequence constraint generating unit of the virtual machine control device in the second exemplary embodiment.

FIG. 8 is a flowchart illustrating an operation in the sequence constraint generating unit 113 of the generating unit 11. With respect to the sets V of virtual machine names that are identified by the sequence rule identifying unit 112 and the sets H of host machine names, the sequence constraint generating unit 113 generates an operability constraint(s) under which the sets V of virtual machine names are allocated to the sets H of host machine names (C1 to C4). The sequence constraint generating unit 113 repeats the above processing until no unprocessed set V is left (C5).

Any method of allocation may be used, and a set V of virtual machine names may be allocated to a plurality of sets $H_1$ and $H_2$ of host machine names. However, it is preferable to generate an operability constraint in such a way that every set V of virtual machine names is allocated to any one or more of the sets H of host machine names.

A set V of virtual machine names that are similar to each other or for which a sequence rule is defined is capable of reflecting management units of the operations manager of the system. The generating unit 11 is able to limit the management units so as to be allocated to sets H of common host machine names. As a result, it becomes possible to obtain an arrangement of virtual machines that facilitates management carried out by the operations manager.

Next, the virtual machine control device, which is the above-described second exemplary embodiment, will be described by using a specific example.

FIGS. 9A and 9B are examples of the host machine name list, in which the names of host machines on which virtual machines can be arranged are described, and the virtual machine name list, in which the names of virtual machines that are to be arranged are described, respectively.

The virtual machine name list is given to the virtual machine control device 10 in response to a request for arrangement of virtual machines. The host machine name list is stored in the storing unit 15 of the virtual machine control device 10 as the host machine configuration information 151 in advance. The host machine name list may be given to the virtual machine control device 10 in response to a request for arrangement of virtual machines.

Next, the host machine name list and the virtual machine name list will be described by using specific examples.

As illustrated in FIG. 9A, the names of six host machines are included in the host machine name list. All of the six host machine names are described in a form of “DC1-XXXX-YYY”. In this description form of host machine name, “DC1”, “XXXX”, and “YYY” indicate the identifier of a data center, a floor and rack identifier in the data center, and the identifier of a host machine, respectively.

In the example in FIG. 9A, the host machine name “DC1-0305-010” indicates that the host machine is the tenth host machine in the fifth rack on the third floor in the first data center. It is preferable that the form of these host machine names is determined, for example, in carrying out system configuration of the data center based on operations by the operations manager or the like.

On the other hand, the virtual machine name list of virtual machines that are to be arranged, illustrated in FIG. 9B, includes 11 virtual machine names. All of these virtual machine names are described in a form of “AAA-BBB-CCC”. In this example, information of components composing application services is used for the virtual machine names. In the description form of virtual machine name, “AAA”, “BBB”, and “CCC” indicate the name of an application service, the name of a component composing the application service, and the sequential number of the component, respectively.

The virtual machine name “SRV1-WEB1-002” in FIG. 9B indicates a component number 002 that, as the first service, composes an application service WEB 1. “APP” and “DB” in FIG. 9B denote an application and a database, respectively. “BBB” does not have to be a component name that indicates a function of an application service, such as “WEB” and “APP”, and may be a component name that is created by, for example, appending an identification number to “COM”, which denotes a component, such as “COM1” and “COM2”. It is preferable that the forms of component names and virtual machine names are determined in advance by the operations manager or the like in accordance with applications executed by the virtual machine.

Next, a case in which virtual machines that are to be arranged are arranged on host machines that are arrangement destinations will be considered. In determining an arrangement, the amount of resources available on the host machines is required to be balanced with the amount of resources that the respective virtual machines require. In other words, the virtual machines that are to be arranged are required to be arranged on the host machines in such a way that the amount of resources available on the host machines that are arrangement destinations is not surpassed.

FIGS. 10A and 10B illustrate resource constraints of the host machines and an example of resource constraints of the virtual machines, respectively. Each of the resource constraints of the host machines illustrated in FIG. 10A indicates an amount of available resources with respect to each host machine. In the example in FIG. 10A, each of the host machines that are arrangement destinations has resource limits that the host machine has four CPU cores and a memory capacity of 12 GB (Giga Byte). Resource constraints may include, in addition to the number of CPU cores and memory capacity, the number of NICs (Network Interface card), recording capacity of storage disks, and I/O (Input/Output) bandwidth.

On the other hand, the virtual machine resource constraints illustrated in FIG. 10B indicate amounts of resources that the respective virtual machines require. For example, it is illustrated that the component WEB in the service SRV1 requires a CPU core and a memory capacity of 2 GB.

For the case in which a virtual machine arrangement is determined in such a way as to satisfy the resource constraints as described above, a guideline that virtual machines are intensively arranged on as few host machines as possible based on performance or cost requirements, as disclosed in PTL 1 in the citation list, may be used.

FIG. 11 illustrates an example in which the virtual machines are arranged on the host machines in such a way as to satisfy the resource constraints by using a virtual machine arrangement method disclosed in PTL 1, which is a comparative example. By the arrangement method disclosed in PTL 1, the virtual machines are intensively arranged on 5 out of 6 host machines.

However, in the arrangement example illustrated in FIG. 11, virtual machines providing the service SRV1 and virtual machines providing the service SRV2 are arranged on the respective host machines in a mixed manner, which causes a poor view of arrangement from the perspective of operational management.

In the comparative example, an arrangement of virtual machines is determined regardless of the component numbers of applications. For example, a virtual machine with a virtual machine name "SRV2-COM1-001" and a virtual machine with a virtual machine name "SRV2-COM1-02" are arranged on host machines without reflection of relations between the applications thereof. Thus, it is difficult for the operations manager to identify sets of components.

In the comparative example, host machines with host machine names of "DC1-0101-*" and host machines with host machine names of "DC1-0305-*" are located on different floors in the first data center. Thus, the service SRV1 Hand the service SRV2 are arranged across the different floors. Thus, when a failure occurs, the operations manager is required to move back and forth between the different floors for recovery work for the host machines, causing a substantial loss in operability.

On the other hand, in the respective exemplary embodiments of the present invention, an operability constraint(s) based on host machine names and virtual machine names is/are generated by the generating unit of the virtual machine control device, and the host machine names include location information of the respective host machines in the data center. Further, the virtual machine names include information of components composing application services. Thus, it becomes possible to carry out arrangement of virtual machines with a reflection of operability in determining a virtual machine arrangement.

Hereinafter, an example will be described in which the host machine name list in FIG. 9A and the virtual machine name list in FIG. 9B are applied to the virtual machine control device, which is the second exemplary embodiment.

First, the generating unit 11 of the virtual machine control device 10 judges similarities between the host machine names. Based on the similarities, the generating unit 11 generates sets "DC1-0101" and "DC1-0305" of host machine names. It is possible to acquire the sets of host machine names by searching a partial match between character strings with respect to the respective host machine names.

In a similar manner, the generating unit 11 judges similarities between the virtual machine names and generates sets "SRV1-WEB1", "SRV1-APP1", "SRV1-DB", "SRV2-COM1", "SRV2-COM2", and "SRV2-COM3" of virtual machine names.

Next, the generating unit 11 identifies sequence rules for the sets of host machine names and the sets of virtual machine names.

With respect to the sets of virtual machine names, attention is paid to the last portions of character strings in the virtual machine names. To the character strings, 3 digits sequence numbers have been given, and the generating unit 11 identifies the sequence numbers as a sequence of the virtual machine names. In this case, only carrying out a simple sort in a dictionary order makes it possible to identify a sequence.

Figure 12:
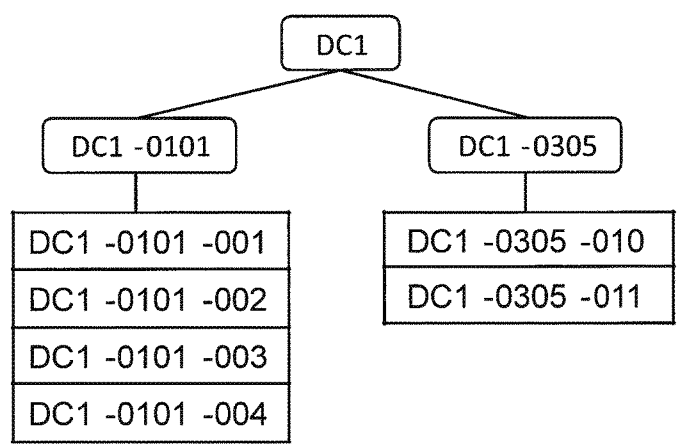
FIG. 12 is a diagram illustrating an example of host machine name sets and host machine names that are classified using a sequence rule.
Figure 13A:
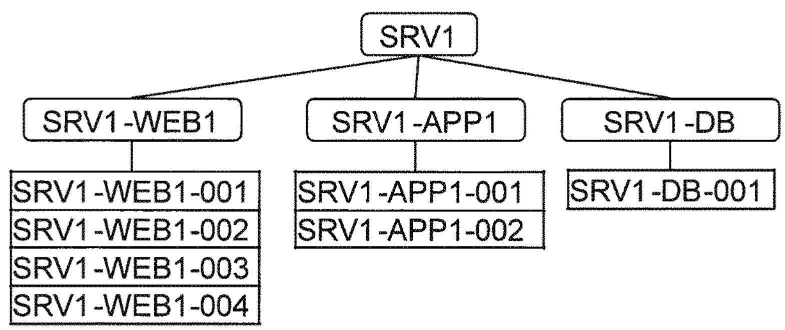
FIG. 13A is a diagram illustrating an example of virtual machine name sets and virtual machine names that are classified using a sequence rule.
Figure 13B:
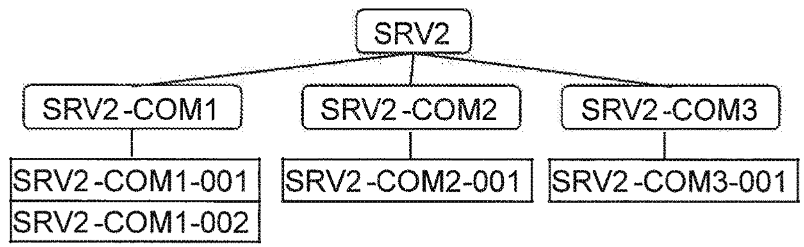
FIG. 13B is a diagram illustrating an example of virtual machine name sets and virtual machine names that are classified using the sequence rule.

In the way as described above, the host machine names and the virtual machine names can be expressed as systems illustrated individually in FIGS. 12, 13A, and 13B.

Since the systems illustrated in FIGS. 12, 13A, and 13B directly reflect a system of operational management, reflecting the systems into virtual machine arrangements is preferable for the operational management.

The generating unit 11 of the virtual machine control device 10 in the second exemplary embodiment is capable of generating an operability constraint into which a specific sequence rule for a set of virtual machines is reflected as a sequence in arranging the virtual machines. For example, the generating unit 11 is capable of generating a constraint to arrange virtual machines on the host machines "DC1-0101-001", "DC1-0101-002 ", "DC1-0101-003", and "DC1-0101-004", in the set "DC1-0101" of host machines illustrated in FIG. 12, in this sequence.

The generating unit 11 of the virtual machine control device 10 in the second exemplary embodiment is also capable of generating an operability constraint in such a way that virtual machines belonging to a set of virtual machines are arranged on a set of host machines having a commonality.

Referring to such an operability constraint(s), the determining unit 12 of the virtual machine control device 10 determines an arrangement of virtual machines. With this operation, it is possible to determine virtual machine arrangement information that satisfies resource constraints and an operability constraint(s).

FIG. 14 illustrates an example of virtual machine arrangement information that is determined with a reflection of an operability constraint. Based on the operability constraint, the service SRV1 and the service SRV2 are intensively arranged on the set "DC1-0101" of host machines and the set "DC1-0305" of host machines, respectively. With the arrangement information in FIG. 14, since the services that the arranged virtual machines provide are different by floors in the data center, an improvement in operability is expected.

The components in the set "SRV1-WEB1" of virtual machines are arranged on "DC1-0101-001" and "DC1-0101-002" in this sequence, making it possible to easily grasp that four virtual machines are arranged in the set "SRV1-WEB1" of virtual machines.

Further, with the arrangement information with a reflection of operability, which is illustrated in FIG. 14, it is also possible to intensively arrange the virtual machines on five host machines satisfying resource constraints, which is equivalent to the arrangement on five host machines in the comparative example.

[Description of Advantageous Effect]

In the virtual machine control device 10 in the second exemplary embodiment of the present invention, operability constraints that include a set constraint(s) and a sequence constraint(s) based on host machine names and virtual machine names are generated by the generating unit 11. With this configuration, an operations manager of a system is able to obtain operability constraints in accordance with management units of the system and determine a virtual machine arrangement with a reflection of operability.

Regarding the generating unit 11 in the exemplary embodiment, an example using the sequence rule identifying unit 112 or the sequence constraint generating unit 113 is described. When the operability constraint is allowed to be eased, an operability constraint may be used that employs either a sequence rule for virtual machines or a sequence of arrangement on host machines.

<Third Exemplary Embodiment>

Next, a virtual machine control device 60, which is a third exemplary embodiment of the present invention, will be described in detail with reference to the accompanying drawings. A virtual machine control device of the third exemplary embodiment differs from the virtual machine control device of the second exemplary embodiment in that, in generating an operability constraint, information of virtual machines that have been arranged is used in addition to information of virtual machines that are to be arranged.

[Description of Configuration]

Figure 15:
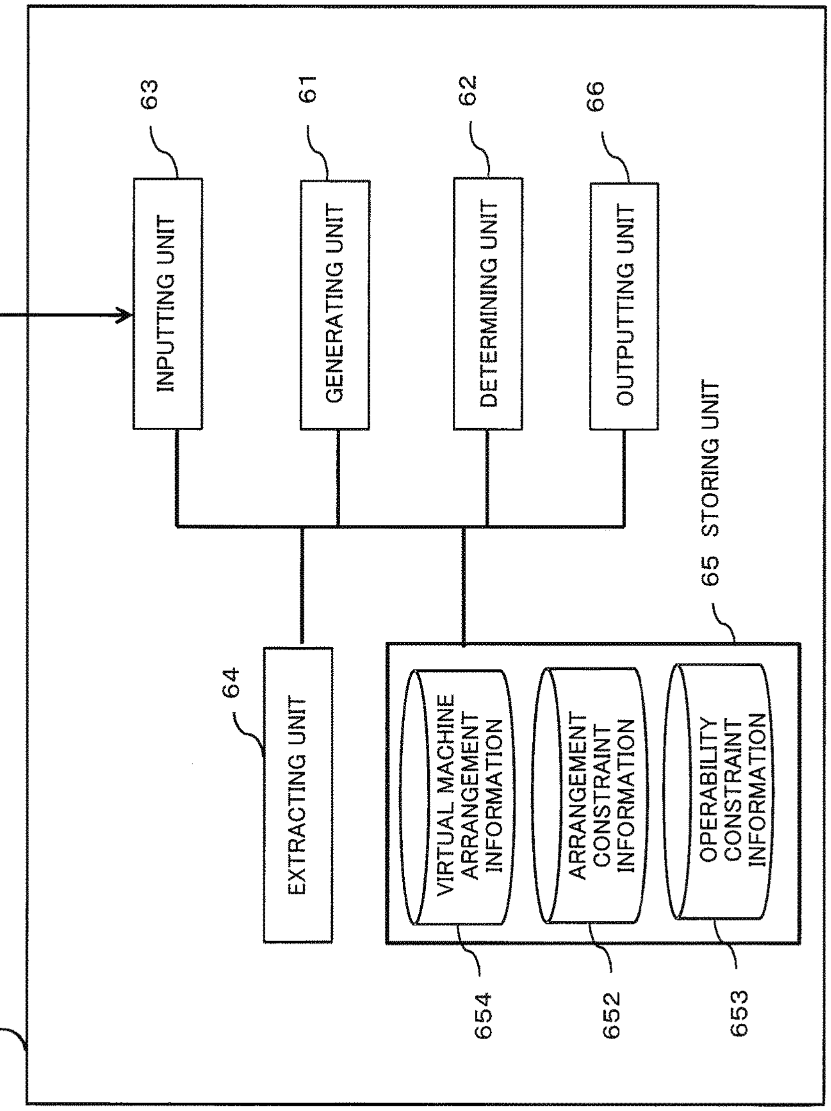
FIG. 15 is a block diagram illustrating a configuration of a virtual machine control device, which is a third exemplary embodiment of the present invention.

FIG. 15 is a block diagram illustrating the configuration of the virtual machine control device 60, which is the third exemplary embodiment of the present invention. As illustrated in the drawing, the virtual machine control device 60 of the third exemplary embodiment includes an inputting unit 63, a generating unit 61, a determining unit 62, an extracting unit 64, a storing unit 65, and an outputting unit 66.

To the inputting unit 63 of the virtual machine control device 60, a request for arrangement of virtual machines is input, and information of virtual machines that are to be arranged, which is described in the request for arrangement, is transmitted to the generating unit 61.

The storing unit 65 of the virtual machine control device 60 stores arrangement constraint information 652 and virtual machine arrangement information 654. The virtual machine arrangement information 654 is information of an arrangement configuration of virtual machines that have hitherto been arranged on host machines.

The extracting unit 64 creates a virtual machine name list in which the names of target virtual machines that have been arranged are described and a host machine name list from the virtual machine arrangement information 654 and transmits the created lists to the generating unit 61.

The generating unit 61 generates an operability constraint(s), referring to a virtual machine name list in which the names of virtual machines that are to be arranged are described and the virtual machine name list and host machine name list extracted by the extracting unit 64.

As with the similarity judging unit 110 of the generating unit 11 of the second exemplary embodiment, a similarity judging unit of the generating unit 61 in the third exemplary embodiment judges respective similarities between host machine names and between virtual machine names. Further, as with the set creating unit 111 of the generating unit 11 of the second exemplary embodiment, a set creating unit of the generating unit 61 creates sets of host machine names and sets of virtual machine names based on the respective similarities therebetween.

As with the sequence rule identifying unit 112 of the generating unit 11 of the second exemplary embodiment, a sequence rule identifying unit of the generating unit 61 identifies a sequence rule for names within each of the sets of host machine names and sets of virtual machine names both of which are created by the similarity judging unit and set creating unit. As with the sequence constraint generating unit 113 of the generating unit 11 of the second exemplary embodiment, a sequence constraint generating unit of the generating unit 61 generates an arrangement constraint(s) to reflect the sequence rules into virtual machine arrangement.

In the storing unit 65, the operability constraint(s) generated by the generating unit 61 are stored as operability constraint information 653. The arrangement constraint information 652 in the storing unit 65 is a constraint(s) that is/are to be reflected in determining an arrangement of virtual machines, and includes resource constraints of the virtual machines and host machines, collocation constraints between virtual machines, or the like.

Referring to the operability constraint(s), the arrangement constraint(s), and information of the current virtual machine arrangement, the determining unit 62 determines an arrangement of virtual machines that satisfies the constraints.

The outputting unit 66 outputs a result of the arrangement of virtual machines that the determining unit 62 has determined.

[Description of Operation]

FIGS. 16 and 17 are flowcharts illustrating an operation of the virtual machine control device, which is the third exemplary embodiment of the present invention.

The inputting unit 63 inputs a request for arrangement of virtual machines (D1), extracts a virtual machine name list in which the names of virtual machines that are to be arranged are described based on information of the request for arrangement (D2), and transmits the extracted virtual machine name list to the generating unit 61.

Next, from the virtual machine arrangement information 654 stored in the storing unit 65, the extracting unit 64 extracts a host machine name list and a virtual machine name list in which the names of virtual machines that have been arranged are described (D3).

Next, the generating unit 61 decides whether or not the request for arrangement of virtual machines includes a virtual machine(s) that has/have been arranged (D4), and, when a virtual machine(s) that has/have been arranged is/are included, the generating unit 61 merges the virtual machine name list in which the names of virtual machines that are to be arranged are described with the virtual machine name list in which the names of virtual machines that have been arranged are described (D5). When no virtual machine that has been arranged is included, the process proceeds to the next step for identifying similarities and regularities.

From the acquired host machine name list and virtual machine name list, the generating unit 61 identifies similarities and regularities between names, generates an operability constraint(s) for virtual machine arrangement (D6 and D7), and stores the generated operability constraint(s) in the storing unit 65 as operability constraint information 653 (D8).

As illustrated in FIG. 17, the generating unit 61 acquires a current virtual machine arrangement information 654 from the storing unit 65 (D9).

When a virtual machine(s) that has/have been arranged is/are included in the request for arrangement of virtual machines, the generating unit 61 appends information of the names of the virtual machine(s) that has/have been arranged to the virtual machine name list in which the names of virtual machines that are to be arranged are described (D10 and D12).

When no virtual machine that has been arranged is included in the request for arrangement, the generating unit 61 generates an arrangement constraint(s) so that resources that the virtual machines that have been arranged have used are not allocated to other virtual machines (D11), and merges the generated arrangement constraint(s) with the arrangement constraint information 652.

Next, the determining unit 62 refers to the arrangement constraint information 652 (D13), also refers to the generated operability constraint(s) (D14), and determines an arrangement of virtual machines that satisfies the given constraints through processing to solve a constraint programming problem (D15).

The determined arrangement of virtual machines is output from the outputting unit 66 (D16).

[Description of Advantageous Effect]

The virtual machine control device 60, which is the third exemplary embodiment of the present invention, generates an operability constraint(s) based on virtual machines that are to be arranged and virtual machines that have hitherto been arranged, and determines an arrangement of virtual machines based on constraints including the generated operability constraint(s). With such a configuration, it becomes possible to determine an arrangement of virtual machines with a reflection of an arrangement configuration of virtual machines that have hitherto been arranged. It is possible to achieve an arrangement of virtual machines that maintains administrative constraints using an arrangement configuration of virtual machines that have been arranged and does not lower operability.

<Fourth Exemplary Embodiment>

Next, a virtual machine control device, which is a fourth exemplary embodiment of the present invention, will be described in detail with reference to the accompanying drawings. The virtual machine control device of the fourth exemplary embodiment differs in that a determining unit of the virtual machine control device includes a searching unit, a score calculating unit, and a selecting unit as a configuration thereof. Detailed description of components and operations that are the same as the components and operations of the virtual machine control device of the second exemplary embodiment will be omitted.

[Description of Configuration]

Figure 18:
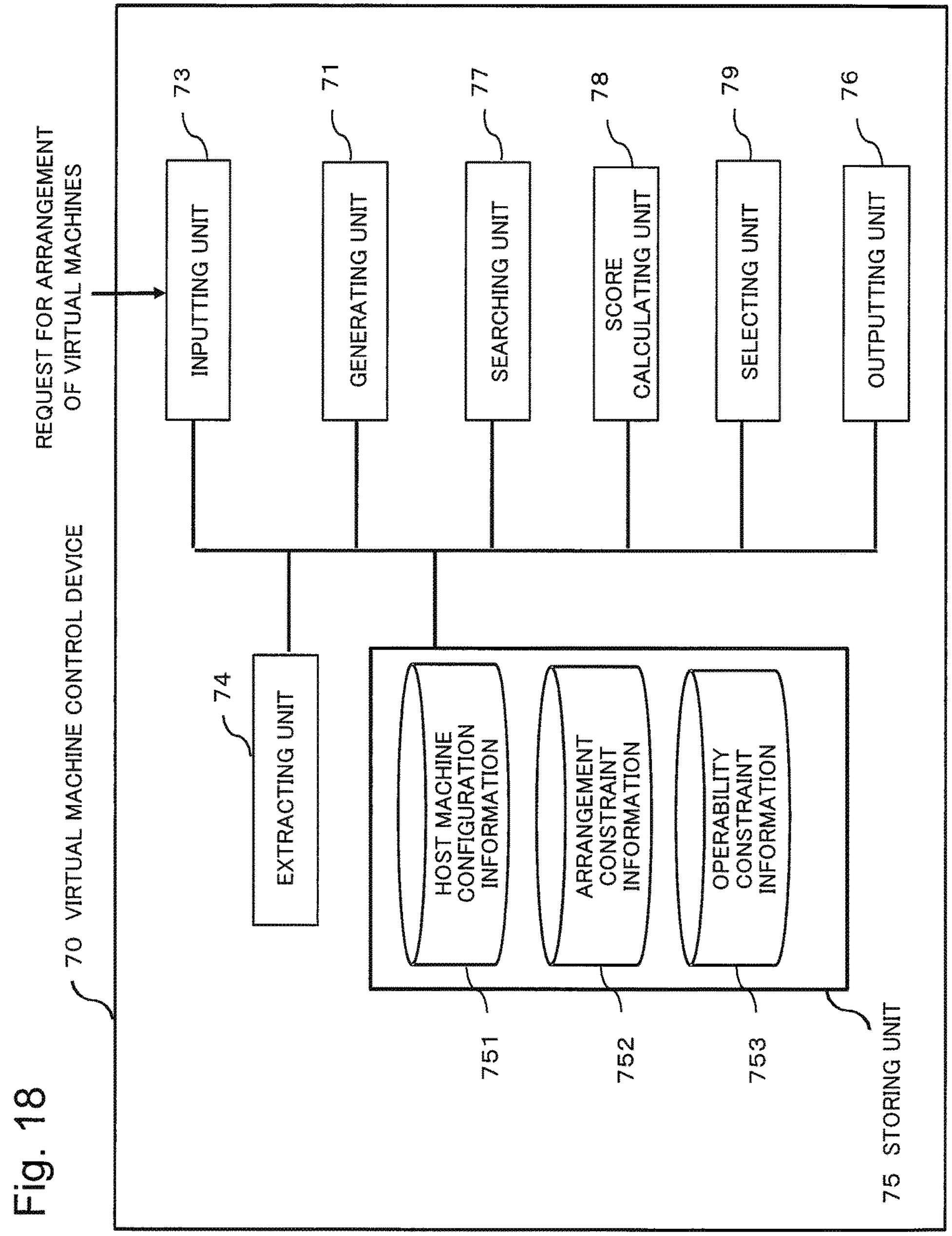
FIG. 18 is a block diagram illustrating a configuration of a virtual machine control device, which is a fourth exemplary embodiment of the present invention.

FIG. 18 is a block diagram illustrating a configuration of the virtual machine control device, which is the fourth exemplary embodiment of the present invention. As illustrated in the drawing, a virtual machine control device 70, which is the fourth exemplary embodiment, includes an inputting unit 73, a generating unit 71, an extracting unit 74, a storing unit 75, an outputting unit 76, a searching unit 77, a score calculating unit 78, and a selecting unit 79.

The storing unit 75 of the virtual machine control device 70 stores host machine configuration information 751, arrangement constraint information 752, and operability constraint information 753 that is generated by the generating unit 71.

Referring to the host machine configuration information 751, the arrangement constraint information 752, and the operability constraint information 753, which are stored in the storing unit 75, the searching unit 77 of the virtual machine control device 70 determines a plurality of candidates of virtual machine arrangement that satisfy the constraints.

Referring to the operability constraint information 753 and the arrangement constraint information 752 for virtual machines, the score calculating unit 78 of the virtual machine control device 70 calculates satisfaction levels for the constraints with respect to each of a plurality of pieces of virtual machine arrangement information that are determined by the searching unit 77.

The selecting unit 79 of the virtual machine control device 70 provides scores for the plurality of pieces of virtual machine arrangement information based on the satisfaction levels for the constraints, and selects a piece of virtual machine arrangement information from the plurality of pieces of virtual machine arrangement information. The selection from a plurality of virtual machines is carried out based on, for example, the highest score.

[Description of Operation]

Figure 19:
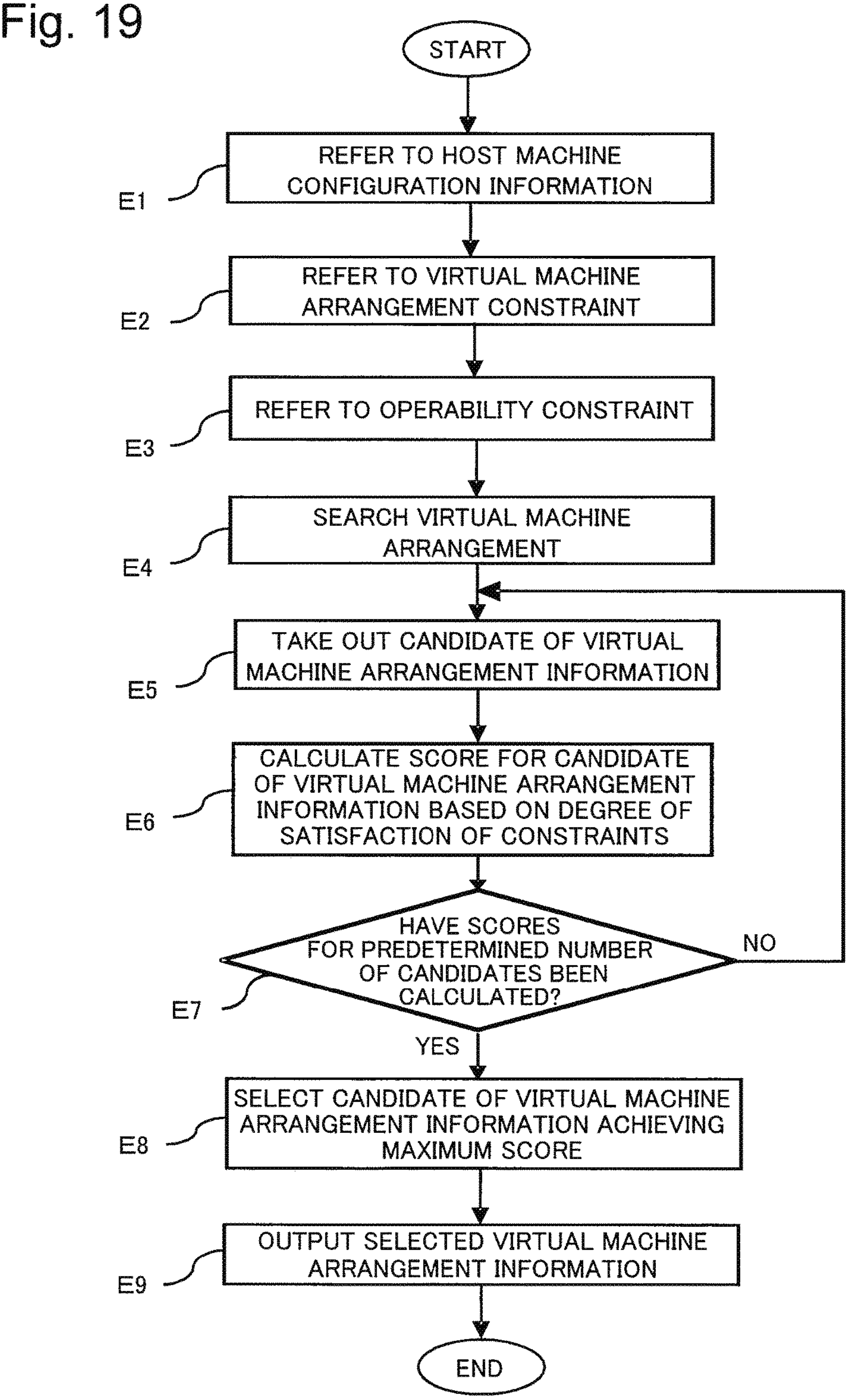
FIG. 19 is a flowchart illustrating an operation of the virtual machine control device, which is the fourth exemplary embodiment of the present invention.

FIG. 19 is a flowchart illustrating an operation of the virtual machine control device, which is the fourth exemplary embodiment of the present invention. An operation of generating an operability constraint(s) in response to the input of a request for arrangement of virtual machines is similar to the operation in the flowchart of the second exemplary embodiment.

After the generation of the operability constraint(s) by the generating unit 71, the searching unit 77 refers to the host machine configuration information 751 (E1), the arrangement constraint information 752 (E2), and the operability constraint information 753 (E3), which are stored in the storing unit 75. Further, the searching unit 77 searches candidates of virtual machine arrangement information satisfying a constraint(s) that is/are required to be satisfied without exception among the arrangement constraints and the operability constraints (E4).

It is assumed that whether or not a constraint is a constraint that is required to be satisfied without exception is specified by a user in advance.

From among a plurality of pieces of virtual machine arrangement information obtained as described above, respective candidates of virtual machine arrangement information are taken out (E5).

The score calculating unit 78 checks the satisfaction levels for the arrangement constraints and the operability constraints of the virtual machines and calculates scores for the candidates of virtual machine arrangement information (E6). When there is a constraint that "a set V of virtual machine names are arranged on a set H of host machine names to the extent possible", the score calculating unit 78 may calculate a score based on the number of virtual machines that have been able to be arranged on the set H of host machine names.

There is a case in which a constraint that "virtual machines $v_1$, $v_2$, $v_3$, and $v_4$ are arranged in a dictionary order to the extent possible" is used. In this case, the score calculating unit 78 may calculate a score based on the number of permutation operations required for transforming an appearance sequence of virtual machines $v_1$, $v_2$, $v_3$, and $v_4$ in arrangement information into a sequence ($v_1$, $v_2$, $v_3$, $v_4$). Further, the score calculating unit 78 may numerically calculate a value of another function-independent requirement that is achieved by candidates of virtual machine arrangement, such as performance and availability, and use the calculated value as a score.

Next, after the score calculating unit 78 calculates scores for a predetermined number of candidates of virtual machine arrangement information (E7), the selecting unit 79 selects a piece of virtual machine arrangement information based on a result of the calculation. It is preferable that a piece of arrangement information with the highest score is selected in the selection (E8).

Last, the selected virtual machine arrangement information is output from the outputting unit 76 to respective host machines (E9).

[Description of Advantageous Effect]

The virtual machine control device 70, which is the fourth exemplary embodiment of the present invention, enables the selection of an arrangement of virtual machines that, after satisfying required arrangement constraints, satisfies as many arrangement constraints or operability constraints, which are required to be satisfied to the extent possible, as possible. With this capability, even when resource constraints and operability constraints are not satisfied strictly, it is possible to determine an arrangement of virtual machines with a reflection of operability to the extent possible.

Even when there are a plurality of candidates of virtual machine arrangement information, or, there is no virtual machine arrangement information that satisfies constraints thoroughly, it is also possible to determine a virtual machine arrangement information that improves operability.

<Hardware Configuration>

Figure 20:
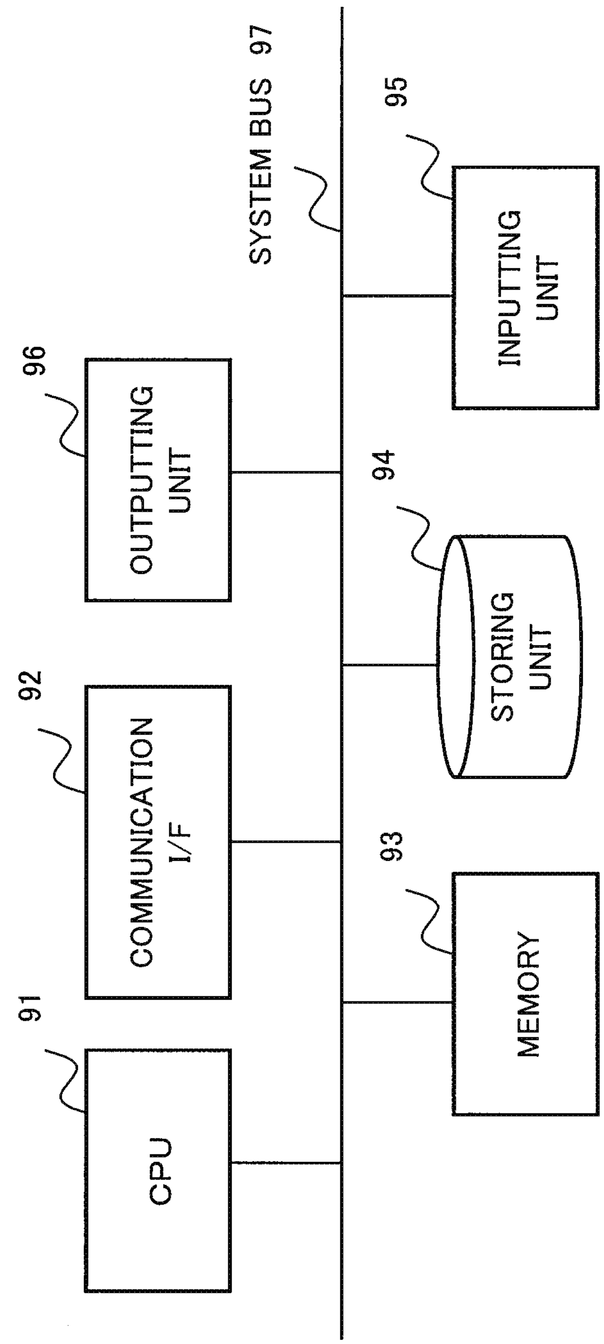
FIG. 20 is a block diagram illustrating a hardware configuration that achieves virtual machine control devices 10 or host machines 30A, 30B, and 30C in the first to fourth exemplary embodiments of the present invention with computer devices.

FIG. 20 is a diagram illustrating a hardware configuration that achieves the virtual machine control devices or host machines in the first to fourth exemplary embodiments of the present invention with computer devices.

As illustrated in FIG. 20, the virtual machine control device or each of the host machines includes a CPU 91, a communication I/F (interface) 92 for network connection, a memory 93, and a storing unit 94 for storing programs, such as a hard disk. The respective components are connected to an inputting unit 95 and an outputting unit 96 via a system bus 97.

By operating an operating system, the CPU 91 controls the virtual machine control device or host machines according to the first to fourth exemplary embodiments of the present invention. The CPU 91 also reads a program or data from, for example, a recording medium mounted on a driving device into the memory 93.

The CPU 91 also has a function to execute, for example, the generating unit, the determining unit, the inputting unit, and the extracting unit in each exemplary embodiment, and carries out the processing of various functions in accordance with the program.

The storing unit 94 is, for example, an optical disk, a flexible disk, a magneto optical disk, an external hard disk, or a semiconductor memory. A storing medium, which is a portion of the storing unit 94, is a nonvolatile storing device, in which programs are stored. The programs are connected to a communication network. The programs may be downloaded from a not-illustrated external computer.

The inputting unit 95 is used for inputting information, and the outputting unit 96 is used for outputting information or the like processed by the CPU 91 for confirmation. As described above, the respective exemplary embodiments of the present invention are achieved by the hardware configuration illustrated in FIG. 20.

The present invention was described above through exemplary embodiments thereof, but the present invention is not limited to the above exemplary embodiments, and various modifications that could be understood by a person skilled in the art may be applied to the configurations and details of the present invention within the scope of the present invention.

All or part of the exemplary embodiments described above may be described as in the following supplementary notes, but the present invention is not limited thereto.

[Supplementary note 1]

A virtual machine control device includes:

a generating unit configured to generate an operability constraint for a virtual machine is to be arranged, based on a virtual machine name list of the virtual machine and a host machine name list of a host machine capable to arrange the virtual machine; and a determining unit configured to determine an arrangement of the virtual machine is to be arranged, based on a constraint including the generated operability constraint, wherein the host machine name includes location information of the host machine, and the virtual machine name includes information of component that composes an application service.

[Supplementary Note 2]

The virtual machine control device according to Supplementary note 1, wherein the operability constraint is a set constraint that stipulates a group of virtual machines arranged together or a sequence constraint that stipulates an arrangement sequence of virtual machines.

[Supplementary note 3]

The virtual machine control device according to Supplementary note 1 or 2, wherein the generating unit includes a similarity judging unit and a set creating unit, the similarity judging unit, for the host machine name list and the virtual machine name list, judges similarities between the host machine name and between the virtual machine name in the lists, and the set creating unit, based on the similarity between host machine names or between virtual machine names judged by the similarity judging unit, creates a set of host machine name or a set of virtual machine name.

[Supplementary note 4]

The virtual machine control device according to Supplementary note 3, wherein the generating unit includes a sequence rule identifying unit, and the sequence rule identifying unit, with respect to each of the created the set of host machine names or the set of virtual machine names, identifies a sequence rule for host machine names or virtual machine names in the set.

[Supplementary note 5]

The virtual machine control device according to any one of Supplementary notes 1 to 4, wherein the generating unit, based on information of the virtual machines that is to be arranged and information of an arranged virtual machine, generates the operability constraint.

[Supplementary note 6]

The virtual machine control device according to any one of Supplementary notes 1 to 4, wherein, when no arranged virtual machine in an arrangement requests of virtual machine, an arrangement constraint(s) is/are generated in such a way that resources that the arranged virtual machine is using are not allocated to (an)other virtual machine(s).

[Supplementary note 7]

The virtual machine control device according to Supplementary note 1, wherein the determining unit includes a searching unit means, a score calculating unit, and a selecting unit, the searching unit, referring to host machine configuration information and arrangement constraint information, which are stored in a storing unit, and operability constraint information generated by the generating unit, determines a plurality of candidates of virtual machine arrangement information that satisfies the constraints, the score calculating unit, referring to the operability constraint information and arrangement constraint information of virtual machines, with respect to each of a plurality of pieces of virtual machine arrangement information that is determined by the searching unit, calculates satisfaction levels for the constraints, and the selecting unit provides scores for the determined plurality of pieces of virtual machine arrangement information based on the satisfaction levels for the constraints and selects a piece of virtual machine arrangement information from the determined plurality of pieces of virtual machine arrangement information based on the scores

[Supplementary note 8]

A virtual machine control method includes:

generating an operability constraint for a virtual machine is to be arranged, basedon a virtual machine name list of the virtual machine and a host machine name list of a host machine capable to arrange the virtual machine; and determining an arrangement of the virtual machine is to be arranged, based on a constraint including the generated operability constraint, wherein the host machine name includes location information of the host machine, and the virtual machine name includes information of component that composes an application service.

[Supplementary note 9]

A non-transitory computer-readable recording medium stores a virtual machine control program. The program causes a computer to execute:

generating an operability constraint for a virtual machine is to be arranged, based on a virtual machine name list of the virtual machine and a host machine name list of a host machine capable to arrange the virtual machine; and determining an arrangement of the virtual machine is to be arranged, based on a constraint including the generated operability constraint, wherein the host machine name includes location information of the host machine, and the virtual machine name includes information of component that composes an application service.

[Supplementary note 10]

A data center includes a virtual machine control device and a host machine. The virtual machine control device includes:

a generating unit configured to generate an operability constraint for a virtual machine is to be arranged, based on a virtual machine name list of the virtual machine and a host machine name list of a host machine capable to arrange the virtual machine; and a determining unit configured to determine an arrangement of the virtual machine is to be arranged, based on a constraint including the generated operability constraint, wherein the host machine name includes location information of the host machine, and the virtual machine name includes information of component that composes an application service.

The present invention claims the benefits of priority based on Japanese Patent Application No. 2013-112906, filed on May 29, 2013, the entire disclosure of which is incorporated herein by reference.

REFERENCE SIGNS LIST

5 Virtual machine arrangement control unit
10, 60, 70 Virtual machine control device
1, 11, 61, 71 Generating unit
2, 12, 62 Determining unit
13, 63, 73 Inputting unit
14, 64, 74 Extracting unit
15, 65, 75 Storing unit
16, 66, 76 Outputting unit
20 Data center
30A,30B, 30C Host machine
40A, 40B, 40C Virtual machine
50A, 50B, 50C Program
77 Searching unit
78 Score calculating unit
79 Selecting unit
80 Application service
91 CPU
92 Communication I/F
93 Memory
94 Storing unit
95 Inputting unit
96 Outputting unit
97 System bus
110 Similarity judging unit
111 Set creating unit
112 Sequence rule identifying unit
113 Sequence constraint generating unit
151, 751 Host machine configuration information
152, 652, 752 Arrangement constraint information
153, 653, 753 Operability constraint information
654 Virtual machine arrangement information

What is claimed is:

1. A virtual machine control device comprising:

a memory configured to store instructions; and at least one processor configured to process the instructions to execute:

a generating unit configured to generate an operability constraint for a virtual machine that is to be arranged, based on a virtual machine name list of the virtual machine and a host machine name list of a host machine in a data center capable to arrange the virtual machine; and a determining unit configured to determine an arrangement of the virtual machine that is to be arranged, based on a constraint including the generated operability constraint, wherein the host machine name includes location information of the host machine in the data center, wherein the virtual machine name includes information of component that composes an application service, and wherein the determining unit comprises a search unit, a score calculating unit, and a selecting unit, the searching unit, referring to host machine configuration information and arrangement constraint information, which are stored in a storing unit, and operability constraint information generated by the generating unit, deter Ines a plurality of candidates of virtual machine arrangement information that satisfies the constraints, the score calculating unit, referring. to the. operability constraint information and arrangement constraint information of virtual machines, with respect to each of a plurality of pieces of virtual machine arrangement information that is determined by the searching unit, calculates satisfaction levels for the constraints, and the selecting unit provides scores for the determined plurality of pieces of virtual machine arrangement information based on the satisfaction levels for the constraints and selects a piece of virtual machine arrangement information from the determined plurality of pieces of virtual. machine arrangement information based on the scores.

2. The virtual machine control device according to claim 1, wherein the operability constraint is a set constraint that stipulates a group of virtual machines arranged together or a sequence constraint that stipulates an arrangement sequence of virtual machines.

3. The virtual machine control device according to claim 1 or 2, wherein the generating unit comprises a similarity judging unit and a set creating unit, the similarity judging unit, for the host machine name list and the virtual machine name list, judges similarities between host machine names and between virtual machine names in the host machine name list and the virtual machine name list, and the set creating unit, based on the similarity between host machine names or between virtual machine names judged by the similarity judging unit, creates a sets of host machine name or a set of virtual machine name.

4. The virtual machine control device according to claim 3, wherein the generating unit comprises a sequence rule identifying unit, and the sequence rule identifying unit, with respect to each of the created the set of host machine names or the set of virtual machine names, identifies a sequence rule for host machine names or virtual machine names in the set.

5. The virtual machine control device according to claim 1, wherein the generating unit, based on information of the virtual machine that is to be arranged and information of an arranged virtual machine, generates the operability constraint.

6. The virtual machine control device according to claim 1, wherein, when no arranged virtual machine in an arrangement request of the virtual machine, an arrangement constraint(s) is/are generated in such a way that resources that the arranged virtual machine is using are not allocated to (an)other virtual machine(s).

7. A virtual machine control method for a virtual machine control device, the method comprising:

generating, by the virtual machine control device, an operability constraint for a virtual machine that is to be arranged, based on a virtual machine name list of the virtual machine and a host machine name list of a host machine in a data center capable to arrange the virtual machine; and determining, by the virtual machine control device, an arrangement of the virtual machine that is to be arranged, based on a constraint including the generated operability constraint, referring to host machine configuration information and arrangement constraint information, which are stored in a storing unit, and operability constraint information generated by a generating unit, determining, by a searching unit, a plurality of candidates of virtual machine arrangement information that satisfies the constraints, referring to the operability constraint information and arrangement constraint information of virtual machines , with respect to each of a plurality of pieces of virtual machine arrangement constraints, and providing scores for the determined plurality of pieces of virtual machine arrangement information based On the satisfaction levels for the constraints and selecting a piece of virtual machine arrangement information from the determined plurality of pieces of virtual machine arrangement information based on the scores, wherein the host machine name includes location information of the host machine in the data center, and wherein the virtual machine name includes information of component that compose an application service.

8. A non-transitory computer-readable recording medium recording a virtual machine control program, the program causing a computer to execute:

generating an operability constraint for a virtual machine that is to be arranged, based on a virtual machine name list of the virtual machine and a host machine name list of a host machine in a data center capable to arrange the virtual machine; and determining an arrangement of the virtual machine that is to be arranged, based on a constraint including the generated operability constraint, referring to host machine configuration information and arrangement constraint information, which are stored in a storing unit, and operability constraint information generated by a generating unit, determining, by a searching unit, a plurality of candidates of virtual machine arrangement information that satisfies the constraints, referring to the operability constraint information and arrangement constraint information of virtual machines, with respect to each of a plurality of pieces of virtual machine arrangement information that is determined by the searching unit, calculating satisfaction levels for the constraints, and providing scores for the determined plurality of pieces of virtual machine arrangement information based on the satisfaction levels for the constraints and selecting a piece of virtual machine arrangement information from the determined plurality of pieces of virtual machine arrangement information based on the scores.

wherein the host machine name includes location information of the host machine in the data center, and wherein the virtual machine name includes information of component that composes an application service.

9. A data center comprising a virtual machine control device and host machines, the virtual machine control device comprising:

a memory configured to store instructions; and at least one processor configured to process the instructions to execute:

a generating unit configured to generate an operability constraint for a virtual machine that is to be arranged, based on a virtual machine name list of the virtual machine and a host machine name list of a host machine in a data center capable to arrange the virtual machine; and a determining unit configured to determine an arrangement of the virtual machine that is to be arranged, based on a constraint including the generated operability constraint, wherein the host machine name includes location information of the host machine in the data center, wherein the virtual machine name includes information of component that composes an application service, wherein the determining unit comprises a searching unit, a score calculating unit, and a selecting unit, the searching unit, referring to host machine configuration information and arrangement constraint information ,which are stored in a storing unit , and operability constraint information generated by the generating unit, determines a plurality of candidates of virtual machine arrangement information that satisfies the constraints, the score calculating unit. referring to the operability constraint information and arrangement constraint information of virtual machines, with respect to each of a plurality of pieces of virtual machine arrangement information that is determined by the searching unit, calculates satisfaction levels for the constraints, and the selecting unit provides scores for the determined plurality pieces of virtual machine arrangement information based on the satisfaction levels for the constraints and selects a piece of virtual machine arrangement information from the determined plurality of pieces of virtual machine arrangement information based on the scores.

* * * * *